US010185252B2

(12) United States Patent
Kawano et al.

(10) Patent No.: US 10,185,252 B2
(45) Date of Patent: Jan. 22, 2019

(54) IMAGE FORMING APPARATUS HAVING GRADATION-SELECTIVE IMAGE FORMING

(71) Applicant: Oki Data Corporation, Tokyo (JP)

(72) Inventors: Masahiro Kawano, Tokyo (JP); Teruaki Kuroda, Tokyo (JP); Yoshiaki Kusakabe, Tokyo (JP)

(73) Assignee: Oki Data Corporation, Tokyo (JP)

( * ) Notice: Subject to any disclaimer, the term of this patent is extended or adjusted under 35 U.S.C. 154(b) by 3 days.

(21) Appl. No.: 15/458,342

(22) Filed: Mar. 14, 2017

(65) Prior Publication Data

US 2017/0285534 A1   Oct. 5, 2017

(30) Foreign Application Priority Data

Mar. 29, 2016 (JP) ................................. 2016-065040

(51) Int. Cl.
*G03G 15/16* (2006.01)
(52) U.S. Cl.
CPC ................................. *G03G 15/1605* (2013.01)
(58) Field of Classification Search
CPC .................................................. G03G 15/1605
See application file for complete search history.

(56) References Cited

U.S. PATENT DOCUMENTS

| 4,927,725 A | * | 5/1990 | Nishide | G03G 13/01 |
| | | | | 430/45.3 |
| 5,771,434 A | * | 6/1998 | Hokari | G03G 15/2028 |
| | | | | 399/303 |
| 5,930,567 A | * | 7/1999 | Agano | G03G 13/08 |
| | | | | 399/223 |

FOREIGN PATENT DOCUMENTS

JP       H10-186748 A       7/1998

* cited by examiner

*Primary Examiner* — G. M. A Hyder
(74) *Attorney, Agent, or Firm* — Rabin & Berdo, P.C.

(57) ABSTRACT

An image forming apparatus includes an image forming unit, a transfer unit, and a controller. The transfer unit transfers a developer image formed by the image forming unit onto a transfer object. The controller controls each of the image forming unit and the transfer unit on a basis of printing data. The controller performs a printing control to cause a first printing operation and a second printing operation to be executed. The first printing operation forms a first developer image directed to an entire pixel region of a print image and transfers the first developer image onto the transfer object. The second printing operation forms a second developer image directed selectively to a high-gradation pixel region and transfers the second developer image onto the transfer object. The high-gradation pixel region is a pixel region, having a gradation value equal to or greater than a threshold, of the print image.

17 Claims, 12 Drawing Sheets

IMAGE FORMING APPARATUS HAVING GRADATION-SELECTIVE IMAGE FORMING

CROSS REFERENCE TO RELATED APPLICATIONS

This application claims the benefit of Japanese Priority Patent Application JP2016-065040 filed on Mar. 29, 2016, the entire contents of which are incorporated herein by reference.

BACKGROUND

The technology relates to an image forming apparatus that uses a developer such as a toner to form an image.

An image forming apparatus may perform image formation on a print medium such as paper and a transparent film, and may thereafter perform fixing and discharging of the medium. For example, reference is made to Japanese Unexamined Patent Application Publication No. H10-186748.

SUMMARY

It is desirable that an image forming apparatus provide a favorable image. What is therefore desired is an image forming apparatus that is able to improve image quality.

It is desirable to provide an image forming apparatus that is able to improve image quality.

An image forming apparatus according to one embodiment of the technology includes: an image forming unit that forms a developer image; a transfer unit that transfers the developer image formed by the image forming unit onto a transfer object; and a controller that performs a printing control that controls an operation of each of the image forming unit and the transfer unit on a basis of printing data that defines a print image having a plurality of pixels. The controller performs the printing control to cause a first printing operation and a second printing operation to be executed. The first printing operation forms a first developer image and transfers the first developer image onto the transfer object. The first developer image is the developer image directed to an entire pixel region of the print image. The second printing operation forms a second developer image and transfers the second developer image onto the transfer object. The second developer image is the developer image directed selectively to a high-gradation pixel region. The high-gradation pixel region is a pixel region, having a gradation value equal to or greater than a threshold, of the print image.

DETAILED DESCRIPTION

In the following, some example embodiments of the technology are described in detail, in the following order, with reference to the accompanying drawings. Note that the following description is directed to illustrative examples of the technology and not to be construed as limiting to the technology. Also, factors including arrangement, dimensions, and a dimensional ratio of elements illustrated in each drawing are illustrative only and not to be construed as limiting to the technology.

1. Example Embodiment (an Example of an Image Forming Apparatus Including First and Second Image Forming Units that Use Developers Having the Same Color as Each Other)
2. Modification Examples First Modification Example (an example of the image forming apparatus in which the first and the second image forming units are disposed adjacent to each other)

Second Modification Example (an example of the image forming apparatus in which an order of printing of first and second developer images is reversed)

Third Modification Example (an example of the image forming apparatus in which printing of the second developer image corresponding to a high-gradation pixel region is performed multiple times)

Fourth Modification Example (an example of the image forming apparatus in which the second developer image is formed with the use of developers of multiple colors)

Fifth Modification Example (an example of the image forming apparatus including a fourth image forming unit used for formation of both of the first and the second developer images)

Sixth Modification Example (an example of the image forming apparatus that employs a direct transfer scheme)
3. Other Modification Examples

[1. Example Embodiment]

[Overall Configuration]

Figure 1:
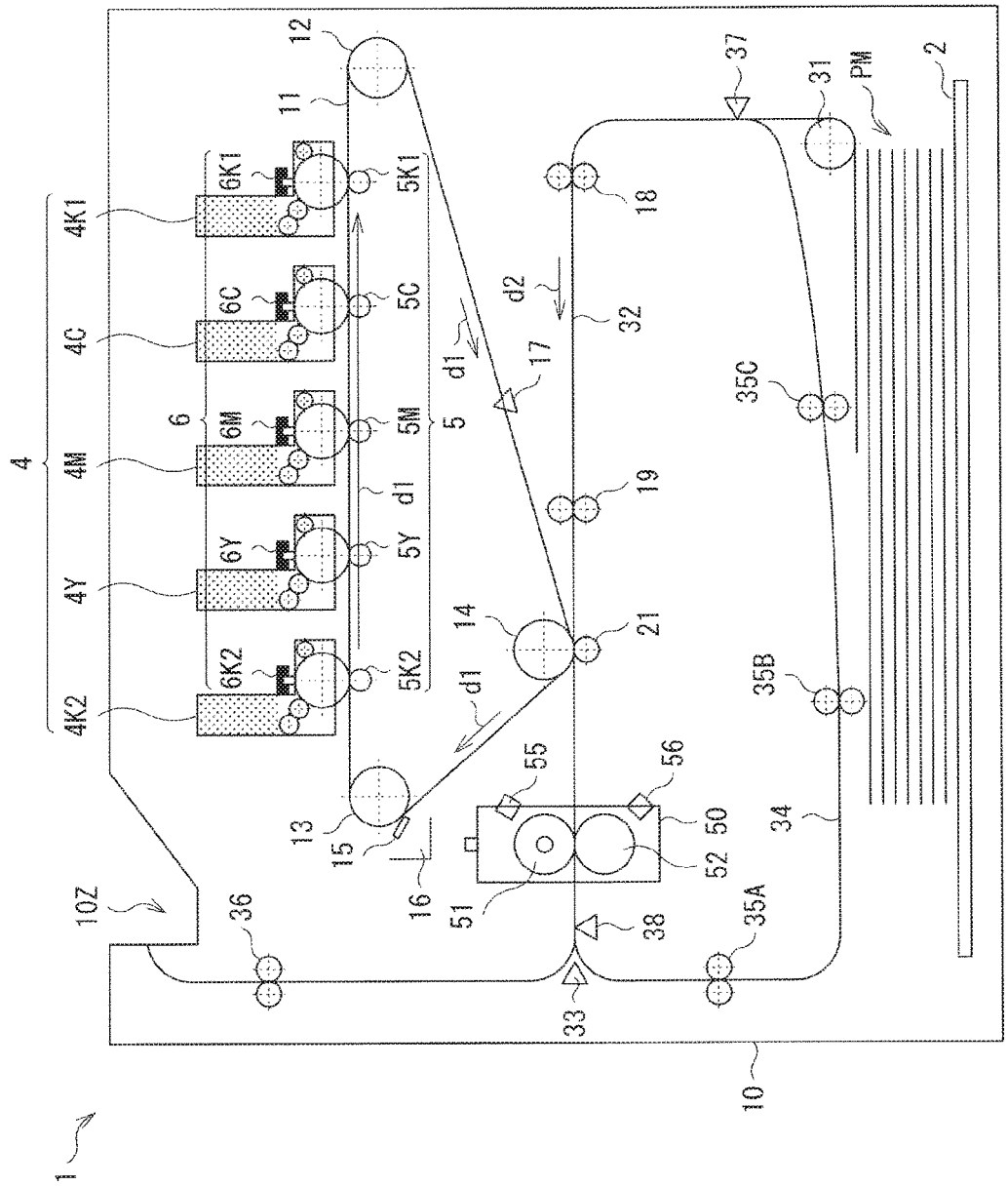
FIG. 1 schematically illustrates an example of an overall configuration of an image forming apparatus according to an example embodiment of the technology.

FIG. 1 schematically illustrates an example of an overall configuration of an image forming apparatus 1 according to an example embodiment of the technology. The image forming apparatus 1 may correspond to an "image forming apparatus" according to one specific but non-limiting embodiment of the technology. For example, the image forming apparatus 1 may be a printer that forms an image such as a monochrome image and a color image on a print medium PM by means of an electro-photography scheme. The print medium PM serving as an object on which printing is to be performed may be any medium such as paper and a film. Further, as described below in greater detail, the image forming apparatus 1 may employ a so-called intermediate transfer scheme in which developer images such as toner images are transferred onto the print medium PM through an intermediate transfer belt 11 to be described later.

The print medium PM may be any paper having relatively high resistance to heat, such as plain paper. The print medium PM may also be a film made of any resin. Non-limiting examples of the resin may include polyethylene (PE), polypropylene (PP), polyvinyl chloride (PVC), and polyethylene terephthalate (PET).

Referring to FIG. 1, the image forming apparatus 1 may include a medium cassette (a medium tray) 2, a hopping roller (a medium feeding roller) 31, a registration sensor (a medium detecting sensor) 37, a pair of registration rollers 18, a pair of conveying rollers 19, a fixing unit 50, and a discharging roller 36. These members may be provided along a conveying path 32 of the print medium PM, i.e., provided in a conveying direction d2 of the print medium PM. The image forming apparatus 1 may further include the intermediate transfer belt 11, a driving roller 12, a driven roller 13, a backup roller 14, a cleaning blade 15, a cleaner container 16, a density sensor 17, five image forming units 4 (i.e., image forming units 4K2, 4Y, 4M, 4C, and 4K1), five primary transfer rollers 5 (i.e., primary transfer rollers 5K2, 5Y, 5M, 5C, and 5K1), a secondary transfer roller 21, and five exposure units 6 (i.e., exposure units 6K2, 6Y, 6M, 6C, and 6K1). These members may be provided along a conveying path of the intermediate transfer belt 11, i.e., provided in a conveying direction d1 of the intermediate transfer belt 11. The image forming apparatus 1 may further include a discharge sensor 38 and a conveyance separator 33 that are both provided in the conveying path 32, and re-conveying rollers 35A, 35B, and 35C that are each provided in a re-conveying path 34 branched from the conveying path 32. Each of the foregoing members may be provided inside a housing 10.

The medium cassette 2 may contain the print media PM in a stacked state. The medium cassette 2 may be detachably mounted at a lower part of the housing 10.

The hopping roller 31 may serve as a medium feeding mechanism that draws out the print media PM contained in the medium cassette 2, one by one in a separated fashion, from the top of the print media PM, and feeds the drawn out print medium PM toward the pair of registration rollers 18.

The pair of registration rollers 18 may convey, in a pinched fashion, the print medium PM fed from the hopping roller 31 toward the intermediate transfer belt 11 while correcting a skew of the print medium PM upon conveying the print medium PM.

The registration sensor 37 may detect passage of the print medium PM fed from the hopping roller 31 in a contact manner or in a non-contact manner. The registration sensor 37 may supply, when the registration sensor 37 detects the passage of the print medium PM, an external I/F 260 provided in a later-described controller controlling unit 200 with an output signal that indicates the passage of the print medium PM.

[Image Forming Units 4]

The image forming units 4K2, 4Y, 4M, 4C, and 4K1 may be disposed in this order in the conveying direction d1 (along the conveying path) of the intermediate transfer belt 11 as illustrated in FIG. 1. In other words, the image forming units 4K2, 4Y, 4M, 4C, and 4K1 may be disposed in a direction from the upstream side to the downstream side as illustrated in FIG. 1.

These image forming units 4K2, 4Y, 4M, 4C, and 4K1 may correspond to an "image forming unit" according to one specific but non-limiting embodiment of the technology. The image forming unit 4K1 and the image forming unit 4K2 may correspond respectively to a "first image forming unit" and a "second image forming unit" according to one specific but non-limiting embodiment of the technology, whereas the image forming units 4Y, 4M, and 4C may correspond to a "third image forming unit" according to one specific but non-limiting embodiment of the technology.

The image forming units 4K2, 4Y, 4M, 4C, and 4K1 may form the developer images (such as the toner images) on the intermediate transfer belt 11 with the use of toners (such as developers) having predetermined colors. More specifically, the image forming units 4K2 and 4K1 each may use a black (K: blacK) toner to form a black toner image, whereas the image forming unit 4Y may use a yellow (Y: Yellow) toner to form a yellow toner image. The image forming unit 4M may use a magenta (M: Magenta) toner to form a magenta toner image, whereas the image forming unit 4C may use a cyan (C: Cyan) toner to form a cyan toner image.

In other words, the two image forming units 4K2 and 4K1 according to the example embodiment may use the toners having the same color as each other, i.e., the black toners in the example embodiment, to form the black toner images. More specifically, the image forming unit 4K2 out of those two image forming units 4K2 and 4K1 may form a black toner image P2, whereas the image forming unit 4K1 may form a black toner image P1, as described later in greater detail. This means that the two image forming units 4K2 and 4K1 may respectively form the black toner images P2 and P1 in an individual fashion. The remaining image forming units 4Y, 4M, and 4C may respectively use the yellow toner, the magenta toner, and the cyan toner that are different in color from the toners used in the image forming units 4K2 and 4K1 (i.e., different in color from the black toners used in the image forming units 4K2 and 4K1), to thereby form the toner images having their respective colors as described above.

The toners having the above-described colors each may include predetermined agents such as a colorant, a releasing agent, a charge control agent, and a treatment agent. The toners may be manufactured through appropriate mixing of components of such agents and/or any appropriate processing such as a surface treatment. Non-limiting examples of a method of manufacturing the toners may include polymerization. The colorant, the releasing agent, and the charge control agent serve as internal additives. Non-limiting examples of an external additive used for each of the toners may include silica and a titanium oxide. Non-limiting examples of a binding resin used for each of the toners may include a polyester resin. Non-limiting examples of the colorant may include a dye and a pigment, which may be used solely or in any combination.

As the toners having the same color as each other, i.e., the black toners in the example embodiment, the two image forming units 4K2 and 4K1 may use the black toners made of the same material as each other, or may use a combination of the black toners made of different materials from each other. Non-limiting examples of toner material that defines the "same material" and the "different materials" as used herein may include a styrene-acryl-based material and a polyester-based material.

The five image forming units 4K2, 4Y, 4M, 4C, and 4K1 may have the same configuration as one another with the exception that they form their respective toner images with the use of the toners having the predetermined colors. In other words, the image forming units 4K2, 4Y, 4M, 4C, and 4K1 each may use corresponding one of the toners having the same color as that of another one of the toners, or may use corresponding one of the toners having the different color from that of another one of the toners.

Figure 2:
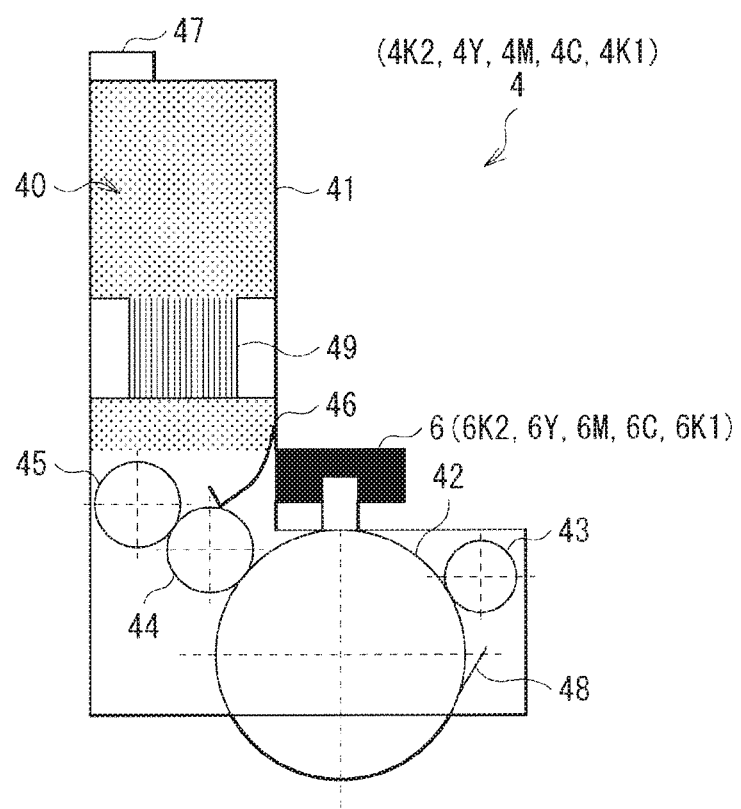
FIG. 2 schematically illustrates an example of a detailed configuration of each image forming unit illustrated in FIG. 1.

FIG. 2 schematically illustrates an example of a detailed configuration of each of the image forming units 4 (i.e., the image forming units 4K2, 4Y, 4M, 4C, and 4K1) illustrated in FIG. 1. Referring to FIG. 2, the image forming units 4 each may include a toner cartridge 41, a photosensitive drum 42, a charging roller 43, a developing roller 44, a feeding roller 45, a developer regulating blade 46, a radio frequency identifier (RFID) 47, a cleaning blade 48, and a duct 49.

The toner cartridge 41 may be a container that contains the toner having one of the colors described above. Note that the toner contained in the toner cartridge 41 is illustrated as a toner 40 in FIG. 2. More specifically, the image forming units 4K2 and 4K1 each may include the black toner inside the toner cartridge 41 as the toner 40. Similarly, the image forming unit 4Y may include the yellow toner inside the toner cartridge 41 as the toner 40. The image forming unit 4M may include the magenta toner inside the toner cartridge 41 as the toner 40. The image forming unit 4C may include the cyan toner inside the toner cartridge 41 as the toner 40. The toner 40 may correspond to a "developer" according to one specific but non-limiting embodiment of the technology.

The photosensitive drum 42 may support an electrostatic latent image on a surface (a superficial part) of the photosensitive drum 42, and may be configured of a photoreceptor such as an organic photoreceptor. More specifically, the photosensitive drum 42 may include an electrically-conductive supporting body and a photoconductive layer that covers an outer periphery (a surface) of the electrically-conductive supporting body. For example, the electrically-conductive supporting body may be a metal pipe made of aluminum. The photoconductive layer may have a configuration in which a charge generation layer and a charge transportation layer are stacked in order, for example. The photosensitive drum 42 may rotate at a predetermined circumferential velocity.

The charging roller 43 may charge the surface (the superficial part) of the photosensitive drum 42, and may be so disposed as to be in contact with the surface (a circumferential surface) of the photosensitive drum 42. For example, the charging roller 43 may include a metal shaft and a semi-electrically-conductive rubber layer that covers an outer periphery (a surface) of the metal shaft. The rubber layer may be a semi-electrically-conductive epichlorohydrin rubber layer, for example. The charging roller 43 may rotate at a predetermined circumferential velocity in a direction opposite to the rotating direction of the photosensitive drum 42, for example.

The developing roller 44 may support, on a surface thereof, the toner 40 that develops the electrostatic latent image. The developing roller 44 may be so disposed as to be in contact with the surface (the circumferential surface) of the photosensitive drum 42. For example, the developing roller 44 may include a metal shaft and a semi-electrically-conductive rubber layer that covers an outer periphery (a surface) of the metal shaft. The rubber layer may be a semi-electrically-conductive urethane rubber layer, for example. The developing roller 44 may rotate at a predetermined circumferential velocity in a direction opposite to the rotating direction of the photosensitive drum 42, for example.

The feeding roller 45 may feed the toner 40 provided inside the toner cartridge 41 to the developing roller 44, may be so disposed as to be in contact with the surface (a circumferential surface) of the developing roller 44. For example, the feeding roller 45 may include a metal shaft and a rubber layer that covers an outer periphery (a surface) of the metal shaft. The rubber layer may be a foamed silicone rubber layer, for example. The feeding roller 45 may rotate at a predetermined circumferential velocity in a direction same as the rotating direction of the developing roller 44, for example.

The developer regulating blade 46 may adjust a factor such as a thickness and an amount of charges of the toner 40 attached to the developing roller 44.

The RFID 47 may be a member in which identification information is written. The identification information may relate to the color of the toner 40, identification number of the toner cartridge 41, or any other factor used for identification.

The cleaning blade 48 may scrape and remove the toner 40 remaining on the surface of the photosensitive drum 42 to thereby clean the surface of the photosensitive drum 42.

The duct 49 may serve as a feeding path upon feeding the toner 40 provided inside the toner cartridge 41 to the feeding roller 45.

[Primary Transfer Rollers 5 ]

The primary transfer rollers 5K2, 5Y, 5M, 5C, and 5K1 each may electrostatically transfer, onto the intermediate transfer belt 11, corresponding one of the toner images having the respective colors which are formed by the image forming units 4K2, 4Y, 4M, 4C, and 4K1. In other words, the primary transfer rollers 5K2, 5Y, 5M, 5C, and 5K1 each may perform a primary transfer of corresponding one of the toner images on the intermediate transfer belt 11. The primary transfer rollers 5K2, 5Y, 5M, 5C, and 5K1 may be so disposed as to face the photosensitive drums 42 of the respective image forming units 4K2, 4Y, 4M, 4C, and 4K1 with the intermediate transfer belt 11 in between. For example, the primary transfer rollers 5K2, 5Y, 5M, 5C, and 5K1 each may be a foamed semi-electrically-conductive rubber member.

[Exposure Units 6]

The exposure units 6K2, 6Y, 6M, 6C, and 6K1 each may perform exposure by irradiating the surface of corresponding one of the photosensitive drums 42 provided in the respective image forming units 4K2, 4Y, 4M, 4C, and 4K1 with irradiation light to thereby form the electrostatic latent image on the surface (the superficial part) of the corresponding photosensitive drum 42. For example, the exposure units 6K2, 6Y, 6M, 6C, and 6K1 may be supported by the housing 10. The exposure units 6K2, 6Y, 6M, 6C, and 6K1 each may include a plurality of light sources and a lens array, for example. The light sources each may emit the irradiation light, and the lens array may cause the irradiation light to be imaged on the surface of the corresponding photosensitive drum 42. Non-limiting examples of each of the light sources may include a light-emitting diode (LED) and a laser device.

The intermediate transfer belt 11 may perform a secondary transfer of the toner images on the print medium PM conveyed by the members such as the pair of registration rollers 18 and the pair of conveying rollers 19. More specifically, the intermediate transfer belt 11 may perform, on the print medium PM, the secondary transfer of the toner images of the respective colors which have undergone the formation by the respective image forming units 4K2, 4Y, 4M, 4C, and 4K1 and have been subjected to the primary transfer onto the intermediate transfer belt 11. The intermediate transfer belt 11 may be stretched and supported by the driving roller 12, the driven roller 13, and the backup roller 14. The driving roller 12 and the driven roller 13 each may drive the intermediate transfer belt 11. The backup roller 14 may form a secondary transfer section together with the secondary transfer roller 21. The backup roller 14 may pinch, together with the secondary transfer roller 21, the intermediate transfer belt 11 and the print medium PM therebetween.

The secondary transfer roller 21, the backup roller 14, and the primary transfer rollers 5K2, 5Y, 5M, 5C, and 5K1 may correspond to a "transfer unit" according to one specific but non-limiting embodiment of the technology. The intermediate transfer belt 11 may correspond to a "transfer object" according to one specific but non-limiting embodiment of the technology.

The cleaning blade 15 may scrape and remove the toners 40 remaining on the intermediate transfer belt 11. The cleaner container 16 may contain the toners 40 scraped by the cleaning blade 15. The density sensor 17 may detect a density (an amount of toner) of each of the toner images having been subjected to the primary transfer onto the intermediate transfer belt 11.

The fixing unit 50 may apply heat and pressure to the toner images, having been subjected to the secondary transfer onto the print medium PM from the intermediate transfer belt 11, and thereby fix the toner images to the print medium PM. The fixing unit 50 may include a heating roller 51 and a pressure-applying roller 52 that are disposed to face each other with the conveying path 32 interposed therebetween. The conveying path 32 may be a path along which the print medium PM is conveyed. The pressure-applying roller 52 may be biased toward the heating roller 51 upon a fixing process to form a nip region therebetween, and may be separated away from the heating roller 51 upon standby and removal of the print medium PM jammed in the conveying path 32 inside the fixing unit 50, for example. The fixing unit 50 may further include a heating roller temperature sensor 55 and a pressure-applying roller temperature sensor 56. The heating roller temperature sensor 55 and the pressure-applying roller temperature sensor 56 may respectively detect a temperature of the heating roller 51 and a temperature of the pressure-applying roller 52 continuously or for each predetermined time, and each may supply an output signal that indicates the detected temperature to the later-described external I/F 260 provided in the controller controlling unit 200 to be described later in greater detail.

The discharge sensor 38 may detect passage of the print medium PM conveyed from the fixing unit 50 in a contact manner or in a non-contact manner. The discharge sensor 38 may supply an output signal that indicates the passage of the print medium PM to the later-described external I/F 260 provided in the controller controlling unit 200 to be described later in greater detail, when the discharge sensor 38 detects the passage of the print medium PM.

The discharging roller 36 may be a guiding member that discharges, to the outside of the image forming apparatus 1, the print medium PM to which the toner images have been fixed by the fixing unit 50. The print medium PM thus discharged by the discharging roller 36 may be stacked on a stacker 10Z provided at an upper part of the housing 10.

[Configuration of Control Mechanism, etc.]

Figure 3:
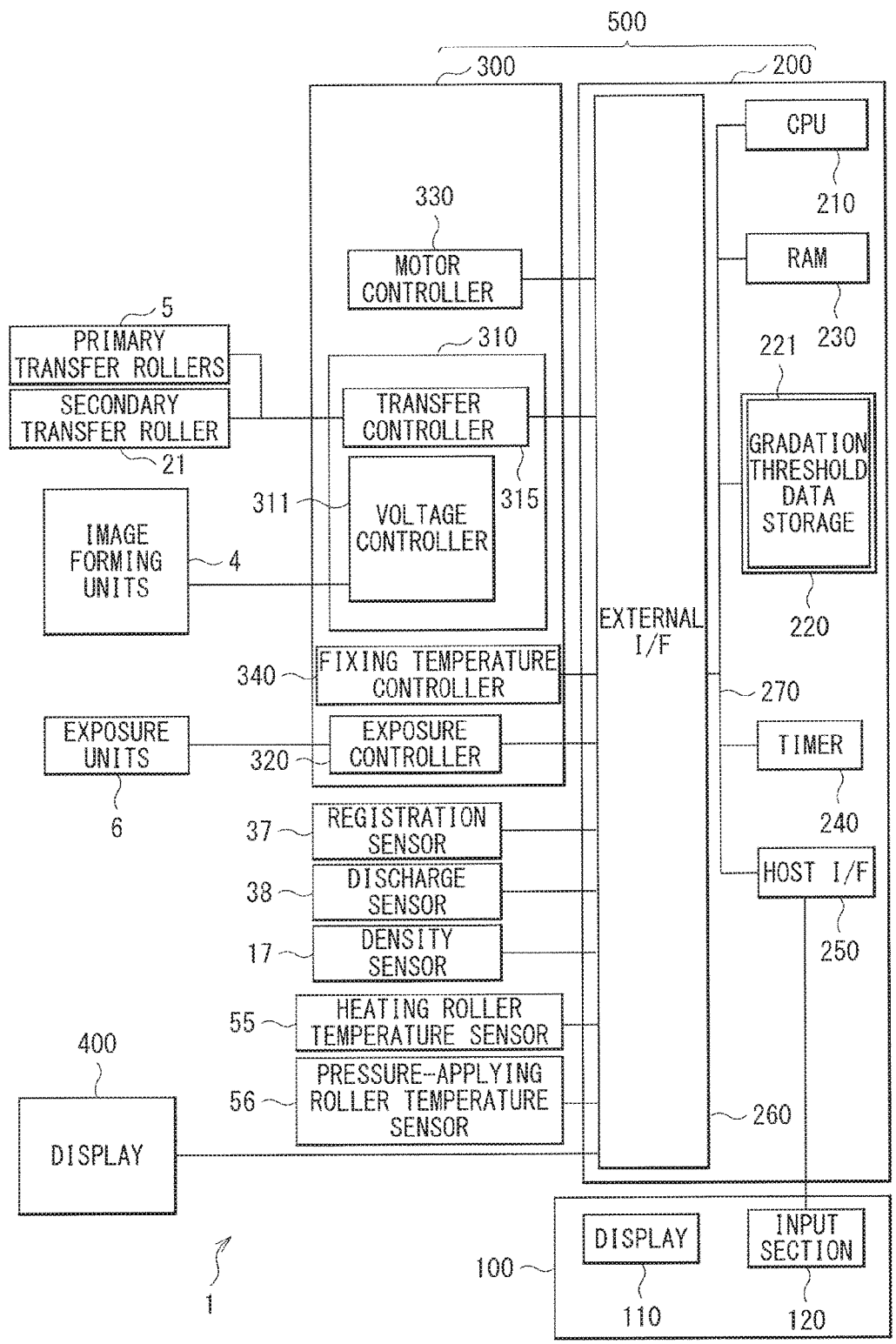
FIG. 3 is a block diagram illustrating an example of a control mechanism and other devices of the image forming apparatus illustrated in FIG. 1.

Reference is now made to FIG. 3 in addition to FIGS. 1 and 2 to describe a control mechanism and other devices provided in the image forming apparatus 1. FIG. 3 is a block diagram illustrating an example of the control mechanism of the image forming apparatus 1 together with devices to be controlled by the control mechanism.

Referring to FIG. 3, the control mechanism of the image forming apparatus 1 according to the example embodiment may include the controller control unit 200, a process controller 300, and a display 400.

The display 400 may display information on the inside of the image forming apparatus 1, and provide a user with the information visually. The display 400 may be a display of any of various display types, such as a liquid crystal display.

[Controller Controlling Unit 200]

The controller controlling unit 200 according to the example embodiment may include a central processing unit (CPU) 210, a read-only memory (ROM) 220, a random access memory (RAM) 230, a timer 240, a host interface (I/F) 250, and the external I/F 260, as illustrated in FIG. 3. The CPU 210, the ROM 220, the RAM 230, the timer 240, the host I/F 250, and the external I/F 260 may be coupled to one another through an internal bus 270.

The CPU 210 may send and receive signals to and from the RAM 230, the timer 240, the host I/F 250, and the external I/F 260 to control an operation of each of those devices, in accordance with a printing process program stored in the ROM 220. The CPU 210 may further send and receive signals to and from the process controller 300 through the external I/F to control an operation of the process controller 300.

The ROM 220 may serve as an area directed to storage of the printing process program, and may be a non-volatile memory that enables the storage of data even after the power of the image forming apparatus 1 is turned off. The ROM 220 may contain pieces of information on printing conditions which are stored prior to the printing operation. Non-limiting examples of the information may include: information on the print medium PM such as brand, a thickness, a kind of material, and heat resistance of the print medium PM; and information on operation such as a temperature condition, a nip pressure, and an operating speed of the fixing unit 50.

According to the example embodiment, the ROM 220 may include a gradation threshold data storage 221 as illustrated in FIG. 3. The gradation threshold data storage 221 may store a later-described gradation threshold Gth as one of the pieces of information on the printing conditions. In an alternative embodiment, however, data on the gradation threshold Gth may be supplied to the image forming apparatus 1 from the outside such as from a later-described external apparatus 100, instead of being stored in advance in the image forming apparatus 1 or in the gradation threshold data storage 221. The gradation threshold Gth may correspond to a "threshold" according to one specific but non-limiting embodiment of the technology. The gradation threshold Gth may be a predetermined gradation value, such as a gradation value of 100%, as described later in greater detail.

The RAM 230 may serve as an area directed to holding of printing data (e.g., printing job or printing command) The printing data may be supplied through a communication line from a host apparatus, i.e., the external apparatus 100. Non-limiting examples of the host apparatus may include a personal computer (PC). The RAM 230 may be a volatile memory in which data held therein is erased after the power of the image forming apparatus 1 is turned off. The RAM 230 may hold information on time measured by the timer 240 and used for various control timings The timer 240 may perform the measurement of the time, and output time data to the CPU 210.

The host I/F 250 may perform transmission and reception of pieces of information such as various control signals and printing data between the external apparatus 100 and the CPU 210.

The external apparatus 100 may include a display 110 and an input unit 120 as illustrated by way of example in FIG. 3. The display 110 may display a print image created by any application software and instructions received from the host I/F 250. The display 110 may be a display of any of various display types, such as a liquid crystal display. The input unit 120 may allow for creation of printing data with the use of any application software. The input unit 120 may also allow for input of medium information and input of response to the instructions received from the host I/F 250. The input unit 120 may include a keyboard, a pointing device, and/or any device that allows for the input.

The external I/F 260 may receive input of various pieces of information such as density data supplied from the density sensor 17, the output signal supplied from each of the registration sensor 37 and the discharge sensor 38, and temperature data, i.e., the output signal, supplied from each of the heating roller temperature sensor 55 and the pressure-applying roller temperature sensor 56.

[Process Controller 300]

The process controller 300 according to the example embodiment may include a high-voltage controller 310, an exposure controller 320, a motor controller 330, and a fixing temperature controller 340 as illustrated in FIG. 3. The process controller 300 may control various printing processes such as the conveyance of the print medium PM, charging, development, transfer, and fixing in an appropriate fashion.

The high-voltage controller 310 may include a voltage controller 311 and a transfer controller 315 as illustrated in FIG. 3. The voltage controller 311 may control high voltages to be applied to respective members such as the charging roller 43, the developing roller 44, and the feeding roller 45 provided in each of the image forming units 4K2, 4Y, 4M, 4C, and 4K1 in an appropriate fashion, in accordance with the control performed by the controller controlling unit 200. The transfer controller 315 may control voltages (i.e., transfer voltages) to be applied to the primary transfer rollers 5K2, 5Y, 5M, 5C, and 5K1 and the secondary transfer roller 21 in an appropriate fashion, in accordance with the control performed by the controller controlling unit 200.

The exposure controller 320 may control factors such as an exposure amount and an exposure timing of each of the exposure units 6K2, 6Y, 6M, 6C, and 6K1, in accordance with the control performed by the controller controlling unit 200.

The motor controller 330 may control an operation of each of various motors provided in the image forming apparatus 1. More specifically, the motor controller 330 may control various motors that drive respective members such as the photosensitive drum 42, the charging roller 43, the developing roller 44, and the feeding roller 45 provided in each of the image forming units 4K2, 4Y, 4M, 4C, and 4K1. The motor controller 330 may also control various motors that drive the hopping roller 31, the pair of registration rollers 18, and the pair of conveying rollers 19.

The fixing temperature controller 340 may adjust a voltage to be applied to a heater provided in the heating roller 51 on the basis of the detection data obtained from each of the heating roller temperature sensor 55 and the pressure-applying roller temperature sensor 56. By adjusting the voltage to be applied to the heater, the fixing temperature controller 340 may control a temperature of the heating roller 51.

[Controller 500]

The controller controlling unit 200 and the process controller 300 both described above with reference to FIG. 3 are collectively referred to as a controller 500 hereinafter for the purpose of convenience. The controller 500 may correspond to a "controller" according to one specific but non-limiting embodiment of the technology.

The controller 500 according to the example embodiment may perform a predetermined printing control on the basis of the printing data that defines the print image having a plurality of pixels, for example. The printing data may be supplied from the external apparatus 100, for example. The printing control may be an operation that controls an image forming operation and a transfer operation, for example. The image forming operation may be directed to an operation of each of the image forming units 4K2, 4Y, 4M, 4C, and 4K1. The transfer operation may be directed to an operation of each of the secondary transfer roller 21, the backup roller 14, and the primary transfer rollers 5K2, 5Y, 5M, 5C, and 5K1. The printing control performed by the controller 500 is described later in greater detail.

[Operation, Workings, and Effects]

[A. Basic Operation of Entire Image Forming Apparatus 1]

The image forming apparatus 1 may perform the printing operation, i.e., the image forming operation, on the print medium PM in the following example manner. Referring to FIG. 3, when the printing data (i.e., the printing job) is supplied to the controller controlling unit 200 from the external apparatus 100 or any other device through a communication line, etc., the controller 500 (i.e., the controller controlling unit 200 and the process controller 300) may execute the printing control, i.e., a printing process, to cause each member provided in the image forming apparatus 1 to perform the following example operation, on the basis of the printing data.

As illustrated in FIG. 1, the print media PM contained in the medium cassette 2 may be picked up, one by one in a separated fashion, from the top by the hopping roller 31. The print medium PM picked up by the hopping roller 31 may be fed to the pair of registration rollers 18 provided downstream of the hopping roller 31 and where the skew of the print medium PM is corrected. The print medium PM following the skew correction by the pair of registration rollers 18 may be conveyed through the pair of conveying rollers 19 to the secondary transfer section at which the backup roller 14 and the secondary transfer roller 21 are disposed to face each other with the intermediate transfer belt 11 interposed therebetween. The toner images formed by the respective image forming units 4K2, 4Y, 4M, 4C, and 4K1 may be sequentially transferred through the intermediate transfer belt 11 onto the surface of the thus-conveyed print medium PM.

Each of the image forming units 4K2, 4Y, 4M, 4C, and 4K1 may form corresponding one of the toner images having the respective colors by means of the following electrophotographic process. First, the surface (the superficial part) of the photosensitive drum 42 may be uniformly charged by the charging roller 43 to which the voltage is applied by the voltage controller 311. Thereafter, the surface of the photosensitive drum 42 is irradiated with the irradiation light emitted from corresponding one of the exposure units 6K2, 6Y, 6M, 6C, and 6K1 to be subjected to exposure. This results in the formation, on the photosensitive drum 42, of the electrostatic latent image corresponding to the print image (i.e., a printing pattern) defined by the foregoing printing data.

Further, the feeding roller 45 and the developing roller 44 may rotate at their predetermined respective circumferential velocities while being in contact with each other. The feeding roller 45 and the developing roller 44 both may be supplied with their respective voltages applied from the voltage controller 311. Thus, the toner 40 may be fed from the feeding roller 45 onto the surface of the developing roller 44.

Thereafter, the toner 40 provided on the developing roller 44 may be charged by factors including friction resulting from contact of the developer regulating blade 46 against the developing roller 44. A thickness of a layer of the toner 40 on the developing roller 44 may be determined by factors including the voltage applied to the developing roller 44, the voltage applied to the feeding roller 45, and a pressure that presses the developer regulating blade 46 against the developing roller 44, i.e., the voltage applied to the developer regulating blade 46.

Further, the application of the voltage to the developing roller 44 that is in contact with the photosensitive drum 42 may cause the toner 40, supported by the developing roller 44, to be attached onto the electrostatic latent image formed on the photosensitive drum 42.

Thereafter, the toner 40 (i.e., the toner image) on the photosensitive drum 42 may be subjected to the primary transfer onto the intermediate transfer belt 11 by means of an electric field generated between the photosensitive drum 42 and corresponding one of the primary transfer rollers 5K2, 5Y, 5M, 5C, and 5K1.

The toner images having the respective colors, having been subjected to the primary transfer onto the intermediate transfer belt 11, may further be subjected to the secondary transfer onto the print medium PM by the foregoing secondary transfer section that includes the backup roller 14 and the secondary transfer roller 21. The toners 40 remaining on the surface of the intermediate transfer belt 11 may be scraped and removed by the cleaning blade 15 upon the secondary transfer. The toners 40 removed by the cleaning blade 15 may be contained in the cleaner container 16.

The toner images having the respective colors may be thus formed in the respective image forming units 4K2, 4Y, 4M, 4C, and 4K1 and may be thus transferred, sequentially in the conveying direction d2, onto the print medium PM in the above-described manner. More specifically, in the image forming units 4K2, 4Y, 4M, 4C, and 4K1, corresponding one of the toners 40 having the respective colors (the black toner, the yellow toner, the magenta toner, the cyan toner, and the black toner) may be used to form an image layer. The thus-formed image layer may be a layer of the toner images having the respective colors.

Thereafter, the toner images formed on the print medium PM may be applied with heat and pressure by the fixing unit 50 and may be fixed onto the print medium PM accordingly. More specifically, the print medium PM conveyed to the fixing unit 50 from the foregoing secondary transfer section may be applied with the heat and the pressure while being nipped by the nip region formed between the members such as the heating roller 51 (or a fixing belt) and the pressure-applying roller 52, whereby the fixing process is performed.

Finally, the print medium PM having been subjected to the fixing process may be discharged to the outside of the image forming apparatus 1 by the discharging roller 36. The thus-discharged print medium PM may be stacked on the stacker 10Z. This may bring the printing operation performed by the image forming apparatus 1 to the end.

[B. Multiple and Duplicative Printing Operations]

There may be a situation in which a medical diagnosis image or any other image is formed on a transparent medium such as a transparent film as the print medium PM. Performing printing on the transparent print medium PM such as the transparent film, however, may possibly involve an insufficient printing density when a printing operation is performed only once. In this case, it is likely that a maximum density or a dynamic range decreases in a print image, which may in turn result in insufficient gradation. For example, a pixel region that requires both a higher density and a higher light-shielding property in the print image, such as a background region, may possibly involve the decrease in maximum density and its consequential decrease in light-shielding property. This makes it difficult to achieve a favorable print image, i.e., leads to deterioration in image quality of the printing. The pixel region that requires both the higher density and the higher light-shielding property is referred to as a high-gradation pixel region.

[B-1. Comparative Example]

To address these issues, the following image forming operation or the printing operation according to a comparative example may typically be performed in the example case. The printing operation according to the comparative example performs printing of a toner image having the same color multiple times, such as twice, on an entire pixel region in an overlaying fashion, i.e., in a duplicative fashion. In other words, the printing operation according to the comparative example is a duplicative printing operation. Performing the duplicative printing operation may increase the printing density, i.e., the maximum density, and thus improve the light-shielding property in the high-gradation pixel region, such as the background region, of the print image. This may improve the image quality of the printing.

The printing operation according to the comparative example, however, performs the printing of the toner image the multiple times in the overlaying fashion on the entire pixel region on an across-the-board basis, without taking into consideration the distinction between the high-gradation pixel region in which both the higher density and the higher light-shielding property are required and a gradation pixel region, unlike the example embodiment as described later in greater detail. The gradation pixel region is a pixel region in which detailed reproducibility, i.e., fine resolution, is required, such as an affected site region. Hence, the printing operation according to the comparative example may cause a position of an image formed in certain printing to be shifted from that of an image formed in another printing during the performing of the printing the multiple times. Such a shift in position of the images may cause the print image to have insufficient resolution and decreased visibility in the gradation image region, such as the affected site region, of the medical diagnosis image. This again makes it difficult to achieve a favorable print image, i.e., leads to the insufficient image quality in the printing.

[B-2. Example Embodiment]

Unlike the foregoing comparative example, the image forming apparatus 1 according to the example embodiment may perform the duplicative printing operation in the following example fashion, for any situation in which the distinction is demanded between the pixel region as the high-gradation pixel region that requires both the higher density and the higher light-shielding property and the pixel region as the gradation pixel region that requires the higher resolution as described above.

The controller 500 illustrated in FIG. 3 may so perform the foregoing printing control according to the example embodiment that the following exemplary printing operation is performed multiple times. For example, the controller 500 may so perform the foregoing printing control that two printing operations including a first printing operation and a second printing operation are performed. The first printing operation may form a later-described toner image P1 and transfer the toner image P1 onto the print medium PM through the intermediate transfer belt 11. The toner image P1 may be a toner image directed to an entire pixel region of a print image. The second printing operation may form a later-described toner image P2 and transfer the toner image P2 onto the print medium PM through the intermediate transfer belt 11. The toner image P2 may be a toner image directed selectively to a pixel region having a gradation value Gp that is equal to or greater than the foregoing gradation threshold Gth in the print image. The pixel region having the gradation value equal to or greater than the gradation threshold Gth may be the high-gradation pixel region.

In particular, the example embodiment may involve the utilization of the two image forming units 4K2 and 4K1 that form their respective toner images (i.e., the black toner images in the example embodiment) with the use of the toners 40 having the same color (i.e., the black toner in the example embodiment) to thereby form the two kinds of toner images P2 and P1 individually. More specifically, the image forming unit 4K2 and the image forming unit 4K1 according to the example embodiment may respectively form the black toner image P2 and the black toner image P1, as described later in greater detail.

[Process of Generating High-Gradation Printing Data and Other Processes]

Figure 4:
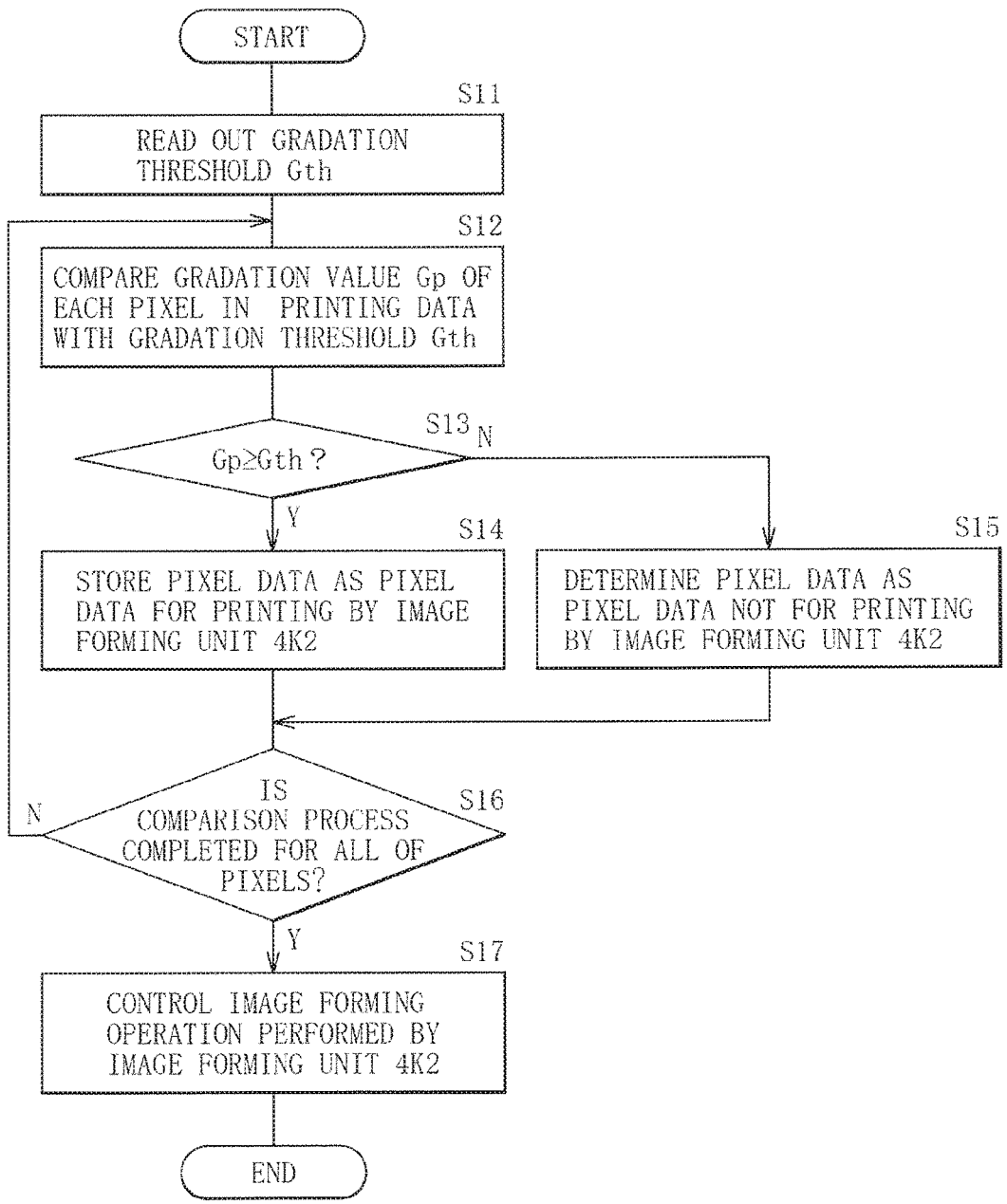
FIG. 4 is a flowchart illustrating an example of processes including a process of generating high-gradation printing data.

FIG. 4 is a flowchart illustrating an example of processes including a process of generating high-gradation printing data used upon the second printing operation. The high-gradation printing data may be printing data used for formation of the toner image P2.

Note that the first printing operation is directed to the entire pixel region in the print image and thus the printing data originally supplied from the external apparatus 100 or any other device may be used as it is upon performing the first printing operation. In other words, the printing data directed to the formation of the toner image P1 may be the same as the original printing data supplied from the external apparatus 100 or any other device.

In the process of generating the high-gradation printing data and other processes illustrated in FIG. 4, the controller 500 may first read out data on the gradation threshold Gth stored in the gradation threshold data storage 221 provided in the ROM 220 (step S11). Thereafter, the controller 500 may compare the gradation value Gp of each pixel included in the original printing data supplied from the external apparatus 100 or any other device with the gradation threshold Gth read out from the gradation threshold data storage 221 (step S12). In other words, the controller 500 may compare the gradation value Gp of each pixel data with the gradation threshold Gth.

More specifically, the controller 500 according to the example embodiment may make a determination as to whether the gradation value Gp is equal to or greater than the gradation threshold Gth (step S13). In other words, the controller 500 may determine whether Gp≤Gth is satisfied. When the gradation value Gp is determined as being equal to or greater than the gradation threshold Gth (step S13: Y), i.e., when Gp≤Gth is satisfied, the controller 500 may thereafter store, as pixel data directed to the high-gradation printing data, the pixel data having the gradation value Gp determined as being equal to or greater than the gradation threshold Gth (step S14). The pixel data directed to the high-gradation printing data may be, in other words, pixel data used for the formation of the toner image P2 or used in the image forming unit 4K2. The flow may thereafter proceed to step S16 to be described later.

When the gradation value Gp is determined as being not equal to or greater than the gradation threshold Gth (step S13: N), i.e., when Gp<Gth is satisfied, the controller 500 may thereafter determine the pixel data having the gradation value Gp, determined as being not equal to or greater than the gradation threshold Gth, as pixel data that is not to be used as the high-gradation printing data, and thus allow that pixel data not to be stored as the high-gradation printing data (step S15). In other words, the controller 500 may determine that the pixel data having the gradation value Gp, determined as being not equal to or greater than the gradation threshold Gth, as pixel data that is not to be printed by the image forming unit 4K2. The flow may thereafter proceed to step S16 to be described later.

Thereafter, the controller 500 may make a determination as to whether the foregoing comparison process is completed for all of the pixels in the printing data (step S16). In other words, the controller 500 may determine whether the comparison is completed for all of the pixels corresponding to a single page. The flow may return to the foregoing step S12 when the determination is made that the comparison process is not yet completed for all of the pixels (step S16: N).

The process of generating the high-gradation printing data may be completed when the determination is made that the comparison process is completed for all of the pixels (step S16: Y). Thus, the controller 500 may selectively extract the pixels, i.e., the pixel data, having the gradation value Gp equal to or greater than the gradation threshold Gth from the original printing data and thereby generate the high-gradation printing data directed to the formation of the toner image P2.

Thereafter, the controller 500 may so perform the printing control that the image forming operation, i.e., the second printing operation, is executed by the image forming unit 4K2 on the basis of the thus-generated high-gradation printing data (step S17). This may bring a series of processes illustrated in FIG. 4 to the end.

[Workings and Effects]

The image forming apparatus 1 according to the example embodiment may perform the following duplicative printing operation when performing the printing on the print medium PM such as a transparent film. In other words, the controller 500 may so perform the printing control as to execute the first printing operation and the second printing operation.

Figure 5:
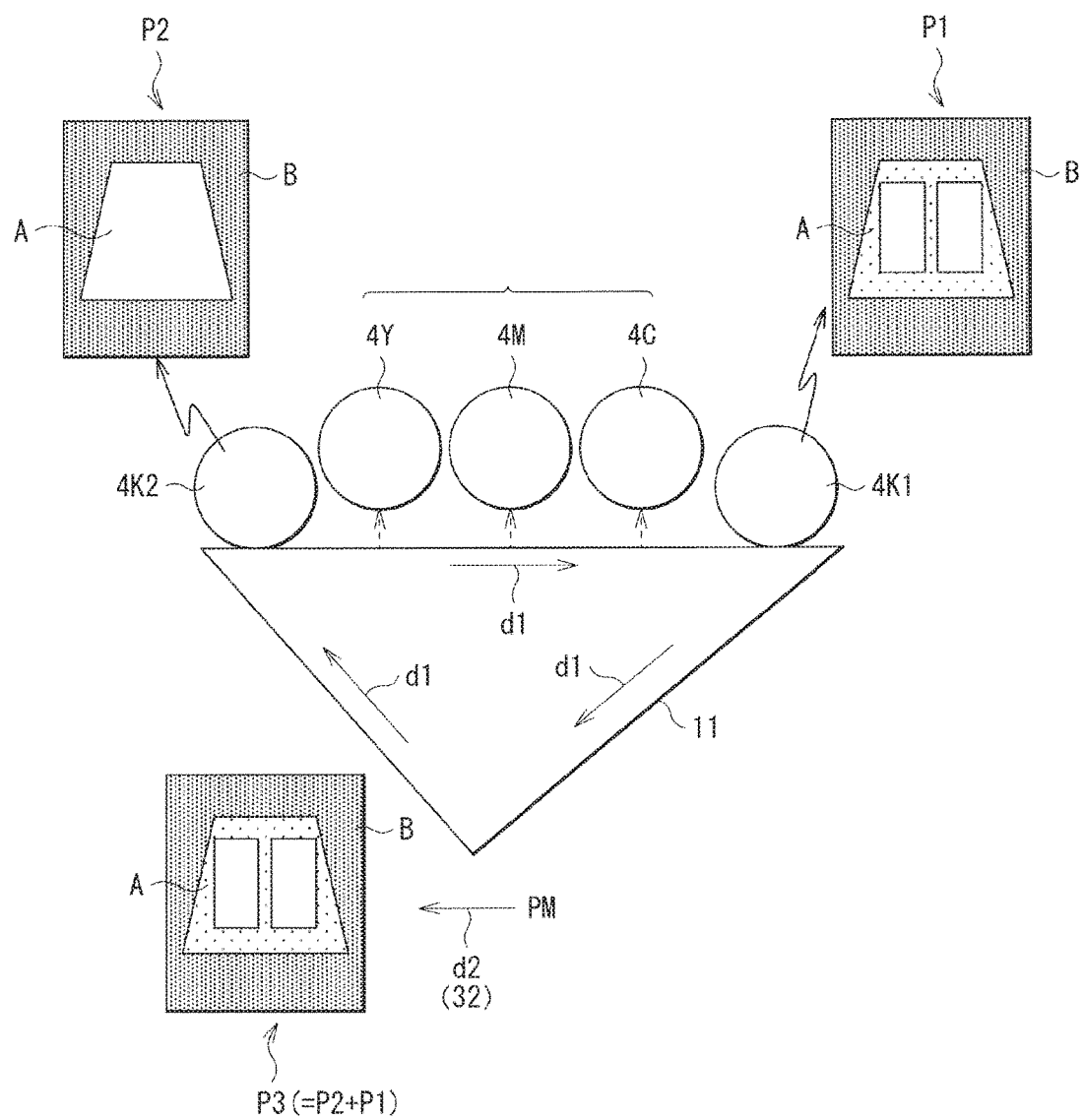
FIG. 5 schematically illustrates an example of a printing operation performed in the image forming apparatus illustrated in FIG. 1.

More specifically, the first printing operation and the second printing operation may be performed by the image forming apparatus 1 as schematically illustrated by way of example in FIG. 5. The controller 500 may so perform the printing control based on the original printing data that the toner image P1, directed to the entire pixel region in the print image, is formed by the image forming unit 4K1 and that the thus-formed toner image P1 is transferred onto the print medium PM through the intermediate transfer belt 11. In other words, the controller 500 may so perform the printing control based on the original printing data that the first printing operation is executed. Further, the controller 500 may so perform the printing control based on the high-gradation printing data that the toner image P2, directed selectively to the pixel region (i.e., the high-gradation pixel region) having the gradation value Gp that is equal to or greater than the gradation threshold Gth in the print image, is formed by the image forming unit 4K2 and that the thus-formed toner image P2 is transferred onto the print medium PM through the intermediate transfer belt 11. In other words, the controller 500 may so perform the printing control based on the high-gradation printing data that the second printing operation is executed.

The print image according to one example illustrated in FIG. 5 may be configured by an affected site region A and a background region B that serves as the high-gradation pixel region. Hence, the toner image P1 may be configured by the entire pixel region that includes both the affected site region A and the background region B, whereas the toner image P2 may be configured selectively by the background region B alone, as illustrated in FIG. 5.

The toner images P1 and P2 each may correspond to a "developer image" according to one specific but non-limiting embodiment of the technology. The toner image P1 may correspond to a "first developer image" according to one specific but non-limiting embodiment of the technology. The toner image P2 may correspond to a "second developer image" according to one specific but non-limiting embodiment of the technology. The entire pixel region having both the affected site region A and the background region B may correspond to an "entire pixel region" according to one specific but non-limiting embodiment of the technology. The background region B may correspond to a "high-gradation pixel region" according to one specific but non-limiting embodiment of the technology.

Performing the duplicative printing operation according to the example embodiment as described above achieves the following effects when the printing is performed on the print medium PM such as a transparent film.

As illustrated by way of example in FIG. 5, the printing density increases as with the foregoing comparative example in the high-gradation pixel region such as the background region B of the print image, owing to the toner images P1 and P2 that are both transferred onto the print medium PM in an overlaying fashion. More specifically, performing the duplicative printing operation allows the printing density, i.e., the maximum density, in the high-gradation pixel region such as the background region B to be increased in a toner image P3 (equals to the sum of the toner image P1 and the toner image P2) finally transferred onto the print medium PM. Hence, it is possible to improve the light-shielding property in the high-gradation pixel region such as the background region B.

In contrast, the toner image P1 is transferred solely onto the print image in a region excluding the high-gradation pixel region of the print image as illustrated by way of example in FIG. 5. The region excluding the high-gradation pixel region may be, for example, the affected site region A. Thus, it is possible to prevent a position of an image formed in certain printing from being shifted from that of an image formed in another printing during the performing of printing the multiple times unlike the foregoing comparative example. In other words, unlike the comparative example, it is possible for the example embodiment to prevent deterioration in the resolution of the region excluding the high-gradation pixel region, such as the affected site region A, of the toner image P3 finally transferred onto the print medium PM.

Figure 6:
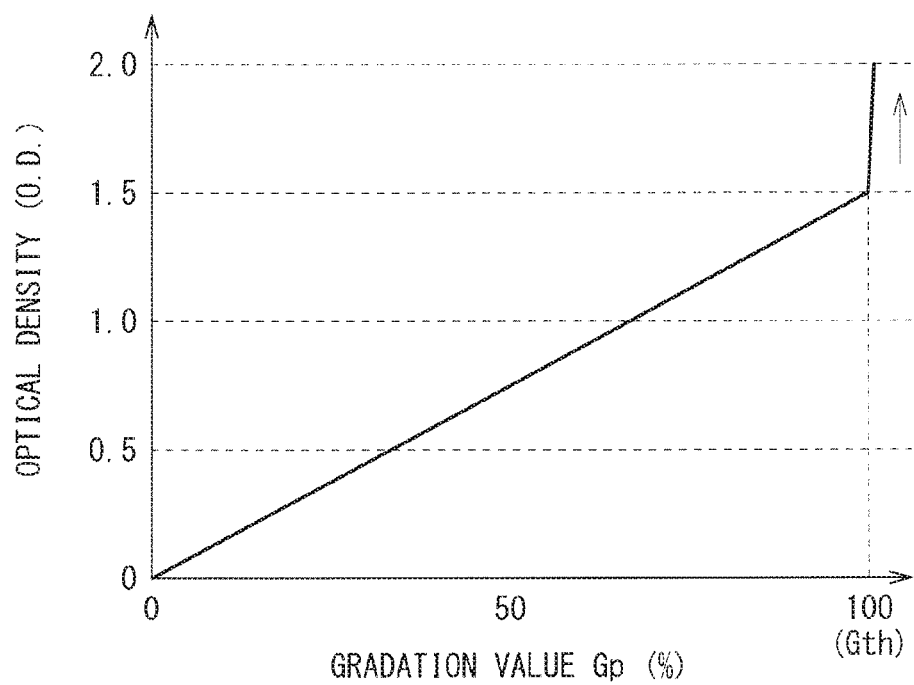
FIG. 6 illustrates an example of a relationship of a gradation value of pixel data versus an optical density of a print image.

FIG. 6 illustrates an example of a relationship of the gradation value Gp of the pixel data included in the printing data versus an optical density (O.D.) of the print image formed on the print medium PM, where the gradation threshold Gth corresponds to the gradation value of 100%. It can be seen from FIG. 6 that the optical density varies linearly depending on the gradation value Gp, since only the toner image P1 is printed when the gradation value Gp is equal to or greater than 0% and less than 100% in one example illustrated in FIG. 6. In other words, only the toner image P1 is printed when the pixel region does not correspond to the high-gradation pixel region. When the gradation value Gp is 100%, i.e., when the pixel region corresponds to the high-gradation pixel region, both the toner image P1 and the toner image P2 are printed in one example illustrated in FIG. 6. Hence, it can be seen from FIG. 6 that the optical density corresponding to the printing density increases in such a manner that the optical density derived from the toner image P2 is added to that derived from the toner image P1, and that the maximum density, i.e., the dynamic range, also increases accordingly.

In particular, the controller 500 according to the example embodiment may so perform the printing control that the printing operation of the toner image P2 as the second printing operation is executed prior to the printing operation of the toner image P1 as the first printing operation, as illustrated by way of example in FIG. 5. In other words, the image forming unit 4K2 that forms the toner image P2 may be located upstream of the image forming unit 4K1 that forms the toner image P1 in the conveying direction d1 of the intermediate transfer belt 11. This configuration according to the example embodiment makes it possible to achieve the following advantages as compared with an example, corresponding to a later-described second modification example, in which the controller 500 so performs the printing control that the first printing operation is executed prior to the second printing operation, which is in reverse order to that of the printing performed in the example embodiment. In the second modification example, the affected site region A is printed upon the formation of the first black toner image, i.e., the toner image P1, possibly raising a concern that the printing density decreases in the affected site region A upon the formation of the second black toner image, i.e., the toner image P2, and the affected site region A fades accordingly. In contrast, the printing of the toner images P1 and P2 according to the example embodiment is performed in reverse order to that according to the second modification example, making it possible to avoid the possibility of the decrease in printing density in the affected site region A.

Further, the controller 500 according to the example embodiment may so perform the printing control that the toner images having the same color as each other, i.e., the black toner images P1 and P2 in the example embodiment, are printed upon the first and the second printing operations at least for the high-gradation pixel region, as illustrated by way of example in FIG. 5. For example, in the example embodiment, the controller 500 may so perform the printing control that the toner images having the same color as each other are printed upon the first and the second printing operations for the entire pixel region that includes both the affected site region A and the background region B. This configuration according to the example embodiment makes it possible to prevent deterioration in image quality of the printing in the high-gradation pixel region such as the background region B attributed to a mixture of colors between the toner images P1 and P2 that are different in color from each other, unlike an example where different colors are used for the respective toner images P1 and P2 in the high-gradation pixel region.

Moreover, the controller 500 according to the example embodiment may so perform the printing control that an operation such as the image forming operation of each of the image forming units 4Y, 4M, and 4C other than the image forming units 4K2 and 4K1 is stopped at least upon the second printing operation. For example, in the example embodiment, the controller 500 may so perform the printing control that, upon the printing of the toner images P1 and P2 formed respectively by the image forming units 4K1 and 4K2, the image forming operation of each of the remaining image forming units 4Y, 4M, and 4C is stopped. More specifically, the image forming units 4Y, 4M, and 4C each may be so controlled as to prevent its image forming operation from being performed by moving the image forming units 4Y, 4M, and 4C to respective positions that do not come into contact with the intermediate transfer belt 11, i.e., to respective positions that are away from the intermediate transfer belt 11, as denoted by dashed arrows in FIG. 5, for example. Hence, it is possible for the example embodiment to prevent deterioration in image quality of the printing attributed to an erroneous transfer of any toner image that is different in color from each of the toner images P1 and P2.

It is to be noted that the two image forming units 4K2 and 4K1 according to the example embodiment which use the toners 40 having the same color (the black toners in the example embodiment) may use the black toners made of the same material as each other, or may use a combination of the black toners made of different materials from each other, as described above. The use of the black toners made of the same material as each other allows for easy fixing of the toners 40 onto the print medium PM for both the toner images P1 and P2 having the same color such as the black color in the example embodiment. Hence, it is possible to improve the image quality of the printing in this respect as well. The use of a combination of the black toners made of different materials from each other, however, may allow for easier fixing of the toners onto the print medium PM than the use of the black toners made of the same material as each other, depending on a combination of toner materials.

According to the foregoing example embodiment, the printing control is so performed that the first printing operation and the second printing operation both described above are performed. This makes it possible to prevent the deterioration in the resolution of the region excluding the high-gradation pixel region such as the affected site region A, while achieving the higher density, e.g., the higher light-shielding property, in the high-gradation pixel region such as the background region B. Hence, it is possible to achieve a favorable image. In other words, it is possible to improve the image quality of the printing.

According to one embodiment, it is therefore possible to provide an image forming apparatus that is able to improve image quality.

[2. Modification Examples]

Hereinafter, a description is given of some modification examples including first to sixth modification examples of the foregoing example embodiment. Note that the same or equivalent elements as those of the example embodiment are denoted with the same reference numerals, and will not be described in detail.

[First Modification Example]

Figure 7:
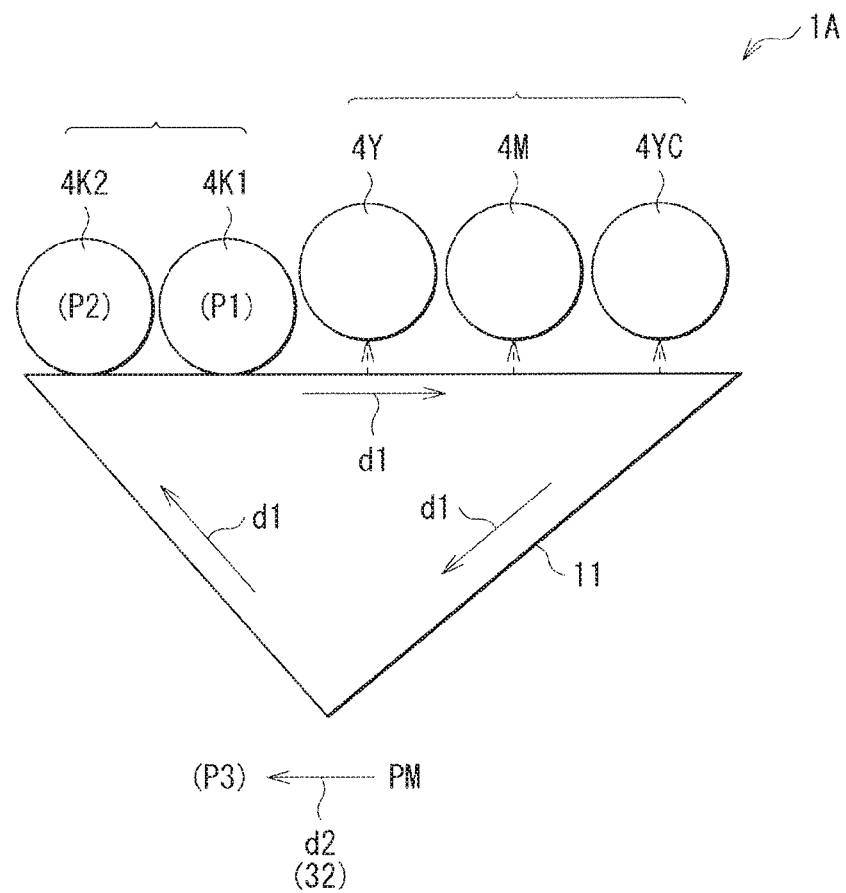
FIG. 7 schematically illustrates an example of a configuration of a key part of an image forming apparatus according to a first modification example, and an example of a printing operation performed in the image forming apparatus according to the first modification example.

FIG. 7 schematically illustrates an example of a configuration of a key part of an image forming apparatus 1A according to a first modification example, and an example of a printing operation performed in the image forming apparatus 1A. The image forming apparatus 1A according to the first modification example is basically similar in configuration to the image forming apparatus 1 according to the foregoing example embodiment, with the exception that the two image forming units 4K2 and 4K1 that use the toners 40 having the same color are disposed adjacent to each other. The toners 40 having the same color each may be the black toner in the first modification example. The image forming apparatus 1A may also correspond to the "image forming apparatus" according to one specific but non-limiting embodiment of the technology.

Referring specifically to FIG. 7, the image forming apparatus 1A may include the image forming unit 4K1 disposed immediately downstream of the image forming unit 4K2 in the conveying direction d1 of the intermediate transfer belt 11. In other words, a position at which the image forming unit 4K1 is disposed is so changed that the image forming unit 4K1 is disposed immediately downstream of the image forming unit 4K2 as compared with the image forming apparatus 1 according to the example embodiment illustrated in FIG. 5.

According to the first modification example, the image forming units that use the toners 40, having the respective colors other than those of the same-colored toners 40 used in the two image forming units 4K2 and 4K1, are not disposed between those two image forming units 4K2 and 4K1. For example, the image forming units 4Y, 4M, and 4C are not disposed between the two image forming units 4K2 and 4K1 that use the toners 40 having the same color. This configuration according to the first modification example reduces a distance between the two image forming units 4K2 and 4K1 relatively, making it further difficult to cause the shift in position of the images in the print image. Hence, it is possible for the first modification example to achieve a further favorable image as compared with the example embodiment. In other words, it is possible to further improve the image quality of the printing.

[Second Modification Example]

Figure 8:
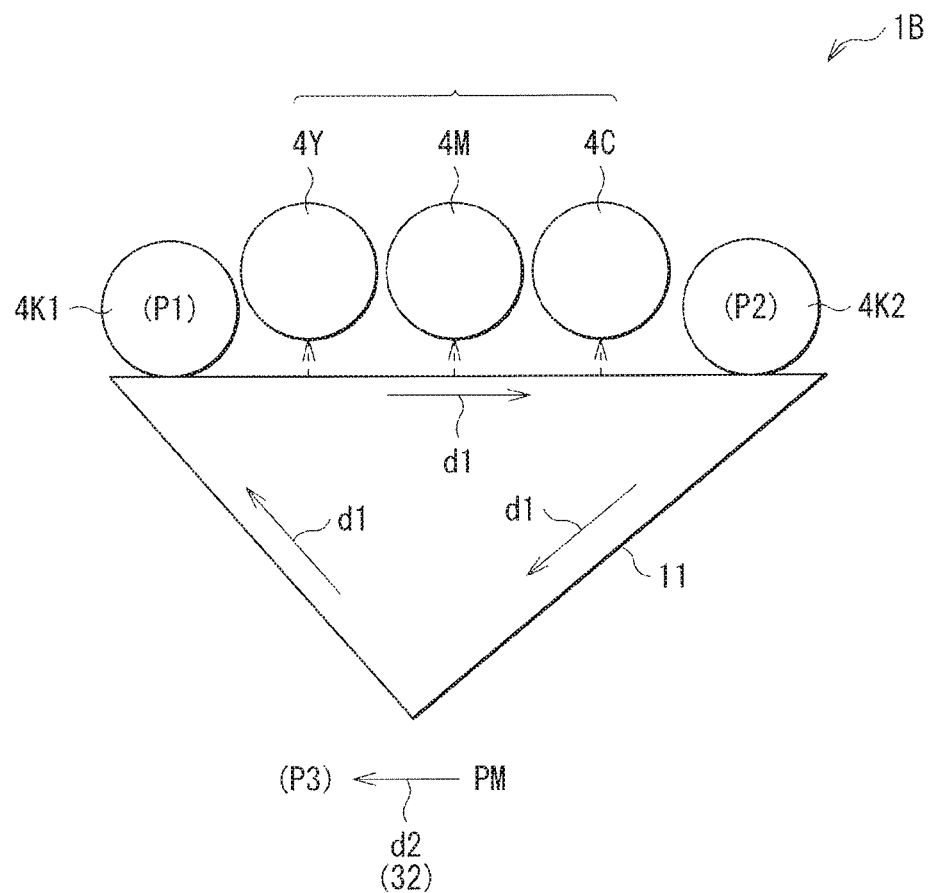
FIG. 8 schematically illustrates an example of a configuration of a key part of an image forming apparatus according to a second modification example, and an example of a printing operation performed in the image forming apparatus according to the second modification example.

FIG. 8 schematically illustrates an example of a configuration of a key part of an image forming apparatus 1B according to a second modification example, and an example of a printing operation performed in the image forming apparatus 1B. The image forming apparatus 1B according to the second modification example is basically similar in configuration to the image forming apparatus 1 according to the foregoing example embodiment, with the exception that the printing of the toner images P1 and P2 as the toner images having the same color is performed in reverse order to that according to the image forming apparatus 1. The toner images P1 and P2 each may have the black color in the first modification example. The image forming apparatus 1B may also correspond to the "image forming apparatus" according to one specific but non-limiting embodiment of the technology.

Referring specifically to FIG. 8, the image forming apparatus 1B may include the image forming unit 4K2 disposed downstream of the image forming unit 4K1 in the conveying direction d1 of the intermediate transfer belt 11. In other words, positions at which the respective image forming units 4K1 and 4K2 that use the toners 40 having the same color, such as the black toners, are changed in reverse as compared with the image forming apparatus 1 according to the example embodiment illustrated in FIG. 5 such that the image forming unit 4K2 is disposed downstream of the image forming unit 4K1. With such a change in position of the image forming units 4K1 and 4K2, the controller 500 in the image forming apparatus 1B may so perform the printing control that the printing operation of the toner image P1 as the first printing operation is executed prior to the printing operation of the toner image P2 as the second printing operation.

Hence, it is also possible for the second modification example to achieve effects similar to those of the example embodiment basically, owing to workings similar to those of the example embodiment.

[Third Modification Example]

Figure 9:
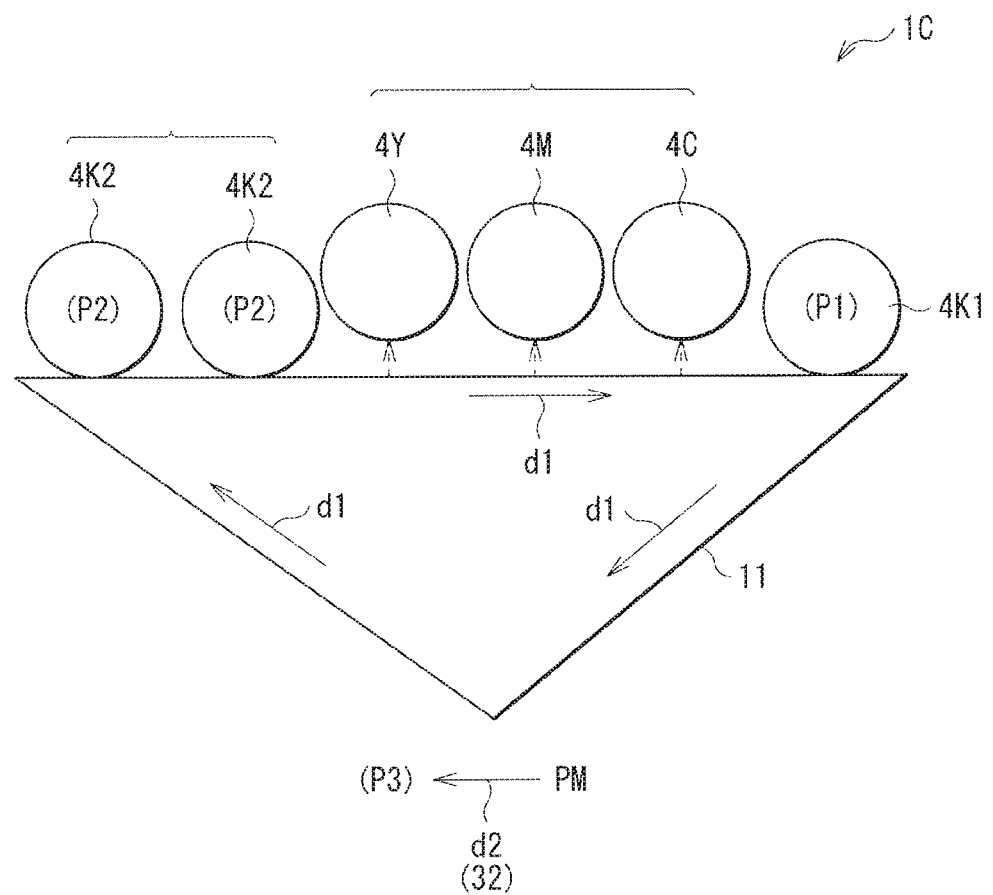
FIG. 9 schematically illustrates an example of a configuration of a key part of an image forming apparatus according to a third modification example, and an example of a printing operation performed in the image forming apparatus according to the third modification example.

FIG. 9 schematically illustrates an example of a configuration of a key part of an image forming apparatus 1C according to a third modification example, and an example of a printing operation performed in the image forming apparatus 1C. The image forming apparatus 1C according to the third modification example is basically similar in configuration to the image forming apparatus 1 according to the foregoing example embodiment, with the exception that the printing of the toner image P2 corresponding to the high-gradation pixel region such as the background region B is performed multiple times. The image forming apparatus 1C may also correspond to the "image forming apparatus" according to one specific but non-limiting embodiment of the technology.

Referring specifically to FIG. 9, the image forming apparatus 1C may include the plurality of image forming units 4K2 each forming the toner image P2. More specifically, the image forming apparatus 1C includes two image forming units 4K2. Further, the two image forming units 4K2 are disposed adjacent to each other in the conveying direction d1 of the intermediate transfer belt 11. With such a change in position and configuration, the controller 500 in the image forming apparatus 1C may so perform the printing control that the printing operation of the toner image P2 as the second printing operation is executed multiple times. More specifically, the controller 500 may so perform the printing control that the second printing operation is executed twice.

According to the third modification example, the printing operation of the toner image P2 is executed the multiple times, making it possible to further increase the printing density, i.e., the maximum density, in the high-gradation pixel region such as the background region B and further improve the light-shielding property in the high-gradation pixel region. Hence, it is possible for the third modification example to achieve a further favorable image as compared with the example embodiment. In other words, it is possible to further improve the image quality of the printing.

It is to be noted that the third modification example employs a configuration in which the two image forming units 4K2 each forming the toner image P2 are provided and the printing operation of the toner image P2 as the second printing operation is executed twice. The technology, however, is not limited thereto. For example, a configuration may be employed in which three or more image forming units 4K2 each forming the toner image P2 may be provided and the printing operation of the toner image P2 as the second printing operation is executed three or more times.

[Fourth Modification Example]

Figure 10:
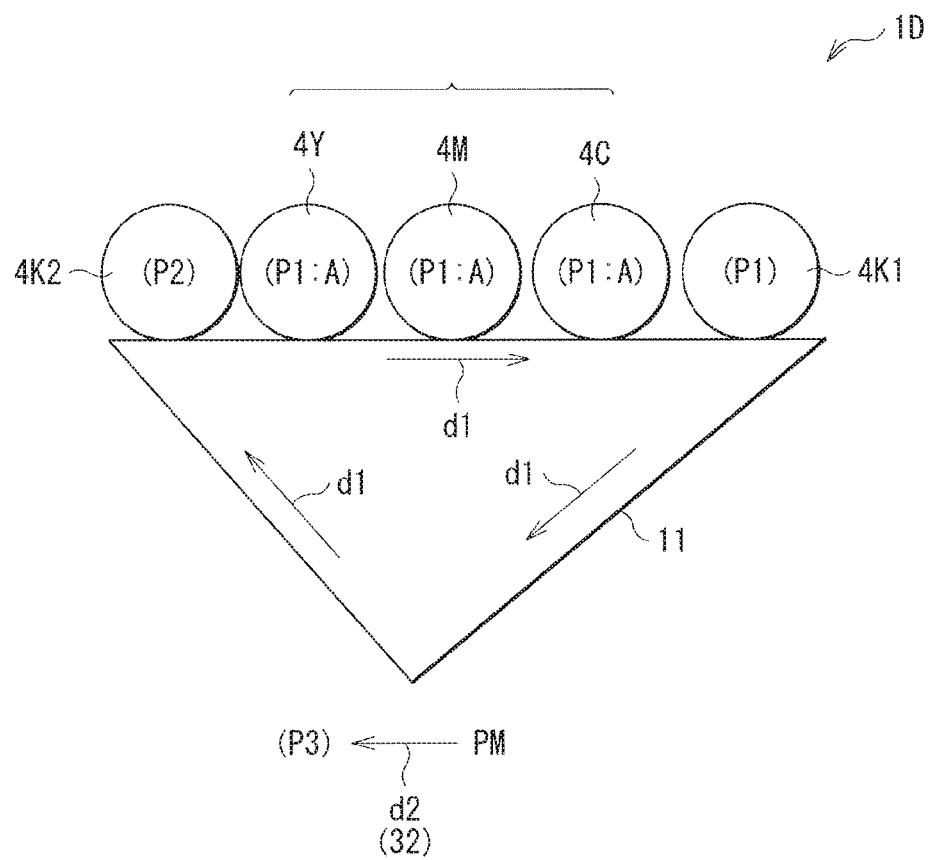
FIG. 10 schematically illustrates an example of a configuration of a key part of an image forming apparatus according to a fourth modification example, and an example of a printing operation performed in the image forming apparatus according to the fourth modification example.

FIG. 10 schematically illustrates an example of a configuration of a key part of an image forming apparatus 1D according to a fourth modification example, and an example of a printing operation performed in the image forming apparatus 1D. The image forming apparatus 1D according to the fourth modification example is basically similar in configuration to the image forming apparatus 1 according to the foregoing example embodiment, with the exception that the toners 40 of multiple colors are used to form the toner image P1. In other words, the image forming apparatus 1D may form the toner image P1 as a colored toner image. The image forming apparatus 1D may also correspond to the "image forming apparatus" according to one specific but non-limiting embodiment of the technology.

Referring specifically to FIG. 10, the image forming apparatus 1D may include the two image forming units 4K2 and 4K1 that use the toners 40 having the same color such as the black toners, and the image forming units 4Y, 4M, and 4C that use the toners 40 having the respective colors other than those of the same-colored toners 40 used in the two image forming units 4K2 and 4K1. The image forming units 4Y, 4M, and 4C may be disposed between the image forming units 4K2 and 4K1 in the conveying direction d1 of the intermediate transfer belt 11. Further, unlike the foregoing example embodiment, the controller 500 according to the fourth modification example may so perform the printing control that an operation such as the image forming operation of each of the image forming units 4Y, 4M, and 4C is not stopped upon the printing of the toner image P1 as the first printing operation. More specifically, as with the image forming units 4K2 and 4K1, the image forming units 4Y, 4M, and 4C each may be so controlled as well upon the first printing operation that the image forming operation thereof is performed by bringing those image forming units 4Y, 4M, and 4C to respective positions that come into contact with the intermediate transfer belt 11.

It is to be noted that, in the fourth modification example, the colored toner image by means of the image forming units 4Y, 4M, and 4C may only be formed for the affected site region A, excluding the background region B, of the toner image P1 (see (P1:A) denoted in FIG. 10). One reason is to prevent deterioration in image quality of the printing in the background region B attributed to a mixture of colors between the black toner image and the colored toner image.

According to the fourth modification example, the multiple colored toners 40 are used to form the toner image P1, i.e., the toner image P1 is formed as the colored toner image, making it possible to provide, for example, a print image which is colored for the affected site region A as described above. Hence, it is possible for the fourth modification example to improve convenience of a user who uses the image forming apparatus 1D as compared with the example embodiment.

[Fifth Modification Example]

Figure 11:
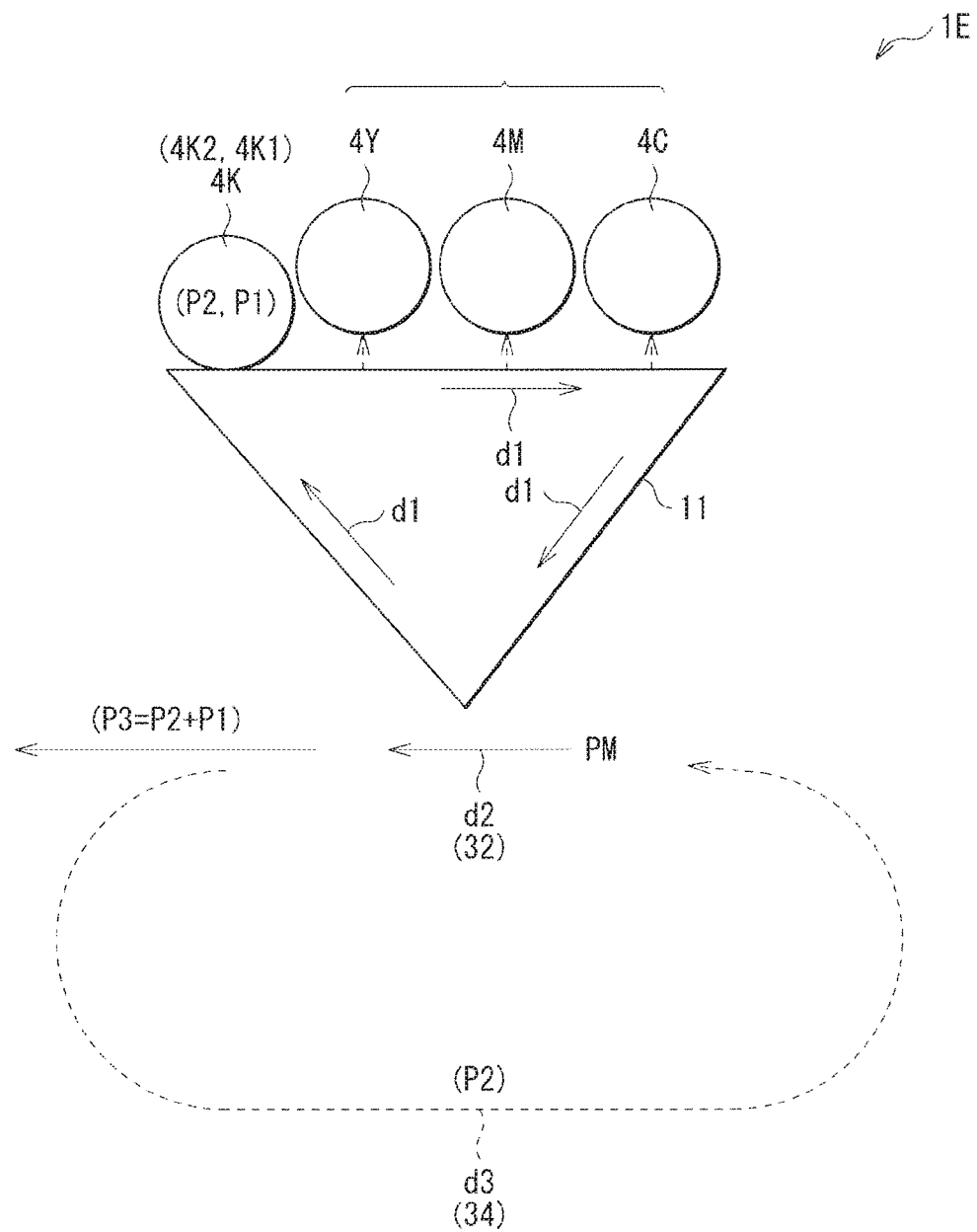
FIG. 11 schematically illustrates an example of a configuration of a key part of an image forming apparatus according to a fifth modification example, and an example of a printing operation performed in the image forming apparatus according to the fifth modification example.

FIG. 11 schematically illustrates an example of a configuration of a key part of an image forming apparatus 1E according to a fifth modification example, and an example of a printing operation performed in the image forming apparatus 1E. The image forming apparatus 1E according to the fifth modification example is basically similar in configuration to the image forming apparatus 1 according to the foregoing example embodiment, with the exception that one or more image forming units 4K is provided instead of the two image forming units 4K1 and 4K2 that respectively form the toner images P1 and P2 in an individual fashion with the use of the toners 40 having the same color such as the black toners. For example, the image forming apparatus 1E may include one image forming unit 4K. The image forming unit 4K may thus form both the toner image P1 and the toner image P2. The image forming apparatus 1E may also correspond to the "image forming apparatus" according to one specific but non-limiting embodiment of the technology.

Referring specifically to FIG. 11, the image forming apparatus 1E may include the image forming unit 4K and the image forming units 4Y, 4M, and 4C. The image forming units 4K, 4Y, 4M, and 4C may be disposed in this order in the conveying direction d1 of the intermediate transfer belt 11. A position at which the image forming unit 4K is disposed, however, is not limited thereto. The image forming unit 4K may be disposed at any position in the conveying direction d1. The image forming unit 4K may correspond to the "image forming unit" or a "fourth image forming unit" according to one specific but non-limiting embodiment of the technology.

The controller 500 according to the fifth modification example may so perform the printing control that the toner image P2 formed by the image forming unit 4K is transferred onto the print medium PM conveyed along the conveying path 32 by the intermediate transfer belt 11, and that the print medium PM, onto which the toner image P2 has been transferred, is thereafter re-conveyed along the re-conveying path 34 in a conveying direction d3. The controller 500 may further so perform the printing control that, following the re-conveyance, the toner image P1 formed by the image forming unit 4K is transferred onto the print medium PM conveyed along the conveying path 32 again by the intermediate transfer belt 11.

According to the fifth modification example, the re-conveying path 34, i.e., the re-conveyance of the print medium PM, is utilized to perform the printing of the toner images P1 and P2 sequentially in a divided fashion in multiple printing processes, instead of printing both of the two toner images P1 and P2 in a single printing process as described up to the fourth modification example. For example, the printing of the toner images P1 and P2 is performed sequentially in a divided fashion by two printing processes. Hence, the fifth modification example allows for application of any of the printing control methods according to the example embodiments and the modification examples described so far to, for example, a general-purpose image forming apparatus in which only one image forming unit is provided for the formation of corresponding one of the toner images having the respective colors with use of corresponding one of the toners having the respective colors.

[Sixth Modification Example]

A description is now given of a sixth modification example. The example embodiment and the first to the fifth modification examples described so far are each directed to the image forming apparatus of a so-called intermediate transfer scheme. In contrast, the sixth modification example illustrates an application to an image forming apparatus of a so-called direct transfer scheme in which the toner images are transferred directly onto the print medium PM without the intervention of the foregoing intermediate transfer belt 11. Accordingly, although the intermediate transfer belt 11 according to any of the example embodiment and the first to the fifth modification examples corresponds to the "transfer object" according to one specific but non-limiting embodiment of the technology, the print medium PM to be described below according to the sixth modification example itself may correspond to the "transfer object" according to one specific but non-limiting embodiment of the technology.

[Configuration Example]

Figure 12:
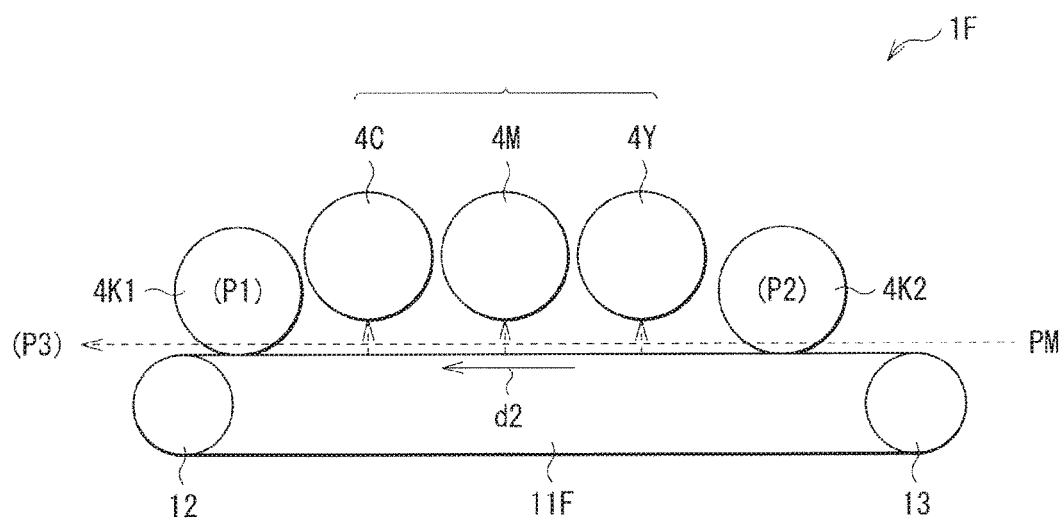
FIG. 12 schematically illustrates an example of a configuration of a key part of an image forming apparatus according to a sixth modification example, and an example of a printing operation performed in the image forming apparatus according to the sixth modification example.

FIG. 12 schematically illustrates an example of a configuration of a key part of an image forming apparatus 1F according to the sixth modification example, and an example of a printing operation performed in the image forming apparatus 1F. The image forming apparatus 1F according to the sixth modification example may also be the printer that forms an image such as a monochrome image and a color image on the print medium PM by means of the electrophotography scheme. The image forming apparatus 1F, however, employs the so-called direct transfer scheme as described above. The image forming apparatus 1F may also correspond to the "image forming apparatus" according to one specific but non-limiting embodiment of the technology.

Referring to FIG. 12, the image forming apparatus 1F may mainly include the five image forming units 4K2, 4Y, 4M, 4C, and 4K1, five transfer rollers, a transfer belt 11F serving as a conveying belt, the driving roller 12, and the driven roller 13.

The image forming units 4K2, 4Y, 4M, 4C, and 4K1 according to the sixth modification example may be disposed along the conveying path of the print medium PM as illustrated in FIG. 12. More specifically, the image forming units 4K2, 4Y, 4M, 4C, and 4K1 may be disposed in this order in the conveying direction d2 of the print medium PM, i.e., in a direction from the upstream side to the downstream side, as illustrated in FIG. 12.

The transfer belt 11F may convey the print medium PM in the conveying direction d2. The transfer belt 11F may be so driven by the driving roller 12 and the driven roller 13 as to be rotated and thus moved in the conveying direction d2 as illustrated in FIG. 12.

The five transfer rollers each may electrostatically transfer, onto the print medium PM, corresponding one of the toner images having the respective colors which are formed by the image forming units 4K2, 4Y, 4M, 4C, and 4K1. The transfer rollers may be so disposed as to face the image forming units 4K2, 4Y, 4M, 4C, and 4K1 with the transfer belt 11F in between, respectively. These transfer rollers may correspond to the "transfer unit" according to one specific but non-limiting embodiment of the technology.

The toner image P1 and the toner image P2 each may be thus transferred directly onto the print medium PM in the sixth modification example as illustrated by way of example in FIG. 12.

[Workings and Effects]

It is also possible for the sixth modification example having the foregoing configuration to achieve effects similar to those of any of the example embodiment and the first to the fifth modification examples basically, owing to workings similar to those of any of the example embodiment and the first to the fifth modification examples. More specifically, the controller 500 according to the sixth modification example may also so perform the printing control as to execute the first printing operation and the second printing operation. In other words, the controller 500 may so perform the printing control that the toner images P1 and P2 are each formed on the print medium PM. This makes it possible to prevent the deterioration in the resolution of the region excluding the high-gradation pixel region such as the affected site region A, while achieving the higher density in the high-gradation pixel region such as the background region B. Hence, it is also possible for the sixth modification example to achieve a favorable image. In other words, it is possible to improve the image quality of the printing.

[3. Other Modification Examples]

Although the technology has been described in the foregoing by way of example with reference to the example embodiment and the modification examples, the technology is not limited thereto but may be modified in a wide variety of ways.

For example, in the example embodiment and the modification examples described above, the configuration such as the shape, the arrangement, the number, and the material of each of the members provided in the image forming apparatus have been specifically described. However, the configurations of the respective members are not limited to those described in the example embodiment and the modification examples described above, and other shapes, arrangement, number, and materials may be employed. The value, the range, the magnitude relationship, etc., of each of the various parameters described in the example embodiment and the modification examples are also not limited to those described in the example embodiment and the modification examples, and the parameters may be so controlled as to achieve any other value, range, magnitude relationship, etc.

The methods of the printing controls performed by the controller 500 have also been specifically described in the example embodiment and the modification examples described above. However, the methods are not limited to those described in the example embodiment and the modification examples, and any other method may be used to perform any of the printing controls. For example, the methods of the printing controls described in the example embodiment and the modification examples may be used in any combination.

The example embodiment and the modification examples have been described by referring to an example in which the gradation threshold Gth basically corresponds to a gradation value of 100%. The gradation threshold Gth, however, is not limited thereto. Any gradation value such as 50%, 75%, and 90% may be set as the gradation threshold Gth depending on a factor such as purpose and application.

Further, the example embodiment and the modification examples have been described by referring to an example in which the five image forming units 4K2, 4Y, 4M, 4C, and 4K1 serving as image drum units are provided. However, arrangement of the image forming units is not limited thereto. A configuration may be employed that includes one or a plurality of image forming units, such as two or more image forming units, each of which is directed to the formation of the toner images having the respective colors with the use of the toners 40 having their predetermined colors. For example, factors such as the number of image forming units directed to the formation of the toner images, a combination of colors of the toners 40 used in the image forming units, and an order of formation of the toner images having the respective colors (i.e., an arrangement order of the image forming units) may be set on an as-needed basis depending on applications and purposes.

A series of processes described in the example embodiment and the modification examples may be performed on the basis of hardware such as a circuitry or on software such as a program. In one embodiment where the processes are implemented based on the software, the software may contain a group of programs that causes a structure such as a computer and a processor to execute each function. The programs may be incorporated in the structure such as the computer and the processor in advance, or may be installed from any network or any storage medium.

The example embodiment and the modification examples have been described by referring to an example in which signals such as the printing data are supplied from the external apparatus 100 that is provided separately from the image forming apparatus 1. A configuration related to the supply of the signals such as the printing data, however, is not limited thereto. For example, a configuration may be employed in which the display 400 includes a touch panel and input of the signals such as the printing data is enabled through the use of the touch panel.

A description has been given of the example embodiment and the modification examples in which the image forming apparatus having a printing function corresponds to the "image forming apparatus" according to one specific but non-limiting embodiment of the technology. However, the term "image forming apparatus" is not limited to the image forming apparatus having a printing function. Besides the image forming apparatus having the printing function, any of the example embodiment and the modification examples described above is applicable to an image forming apparatus having any image-related function such as a scanner function and a facsimile function, and to an image forming apparatus that serves as a multi-function peripheral. The multi-function peripheral may include the scanner function, the facsimile function, or both, in addition to the printing function as described above. Non-limiting examples of the image forming apparatus may include a copying machine and a facsimile machine, besides the printer described as one example of the image forming apparatus in any of the example embodiment and the modification examples.

Furthermore, the technology encompasses any possible combination of some or all of the various embodiments and the modification examples described herein and incorporated herein.

It is possible to achieve at least the following configurations from the above-described example embodiments of the technology.

(1) An image forming apparatus including:
   an image forming unit that forms a developer image;
   a transfer unit that transfers the developer image formed by the image forming unit onto a transfer object; and
   a controller that performs a printing control that controls an operation of each of the image forming unit and the transfer unit on a basis of printing data that defines a print image having a plurality of pixels, the controller performing the printing control to cause a first printing operation and a second printing operation to be executed,
   the first printing operation forming a first developer image and transferring the first developer image onto the transfer object, the first developer image being the developer image directed to an entire pixel region of the print image, and
   the second printing operation forming a second developer image and transferring the second developer image onto the transfer object, the second developer image being the developer image directed selectively to a high-gradation pixel region, the high-gradation pixel region being a pixel region, having a gradation value equal to or greater than a threshold, of the print image.

(2) The image forming apparatus according to (1), wherein the controller performs the printing control to cause the second printing operation to be executed prior to the first printing operation.

(3) The image forming apparatus according to (1) or (2), wherein the controller performs the printing control to cause the second printing operation to be executed multiple times.
(4) The image forming apparatus according to any one of (1) to (3), wherein the controller performs the printing control to cause the developer images having a same color as each other to be transferred onto the transfer object upon the first printing operation and the second printing operation at least for the high-gradation pixel region.
(5) The image forming apparatus according to any one of (1) to (4), wherein
 the image forming unit includes a plurality of image forming units including a first image forming unit that forms the first developer image and a second image forming unit that forms the second developer image, and
 the first image forming unit and the second image forming unit respectively form the first developer image and the second developer image with use of respective developers having a same color as each other.
(6) The image forming apparatus according to (5), wherein
 the plurality of image forming units further includes a third image forming unit that forms the developer image with use of a developer having a color that is different from the color of the developer used by each of the first image forming unit and the second image forming unit, and
 the first image forming unit and the second image forming unit are disposed adjacent to each other along a conveying path of the transfer object.
(7) The image forming apparatus according to (6), wherein the controller performs the printing control to cause an operation of the third image forming unit to be stopped at least upon the second printing operation.
(8) The image forming apparatus according to any one of (5) to (7), wherein the first image forming unit and the second image forming unit respectively form the first developer image and the second developer image with use of the respective developers that have the same color as each other and are made of a same material as each other.
(9) The image forming apparatus according to any one of (5) to (7), wherein the first image forming unit and the second image forming unit respectively form the first developer image and the second developer image with use of a combination of the developers that have the same color as each other and are made of different materials from each other.
(10) The image forming apparatus according to any one of (1) to (4), wherein
 the image forming unit includes a fourth image forming unit that forms both the first developer image and the second developer image, and
 the transfer unit sequentially transfers the first developer image and the second developer image both formed by the fourth image forming unit onto the transfer object.
(11) The image forming apparatus according to any one of (1) to (10), wherein the controller:
 compares the gradation value of each of the pixels included in the printing data with the threshold;
 selectively extracts the pixels each having the gradation value equal to or greater than the threshold and thereby generates high-gradation printing data directed to the formation of the second developer image; and
 performs the printing control to cause the second printing operation to be executed on a basis of the high-gradation printing data.
(12) The image forming apparatus according to any one of (1) to (11), wherein the threshold corresponds to the gradation value of 100%.
(13) The image forming apparatus according to any one of (1) to (12), wherein
 the image forming unit is disposed along a conveying path of an intermediate transfer belt that serves as the transfer object, and
 the transfer unit performs a primary transfer of the developer image formed by the image forming unit on the intermediate transfer belt, and performs a secondary transfer of the developer image transferred onto the intermediate transfer belt on a print medium.
(14) The image forming apparatus according to any one of (1) to (12), wherein
 the image forming unit is disposed along a conveying path of a print medium that serves as the transfer object, and
 the transfer unit directly transfers the developer image formed by the image forming unit onto the print medium.

Although the technology has been described in terms of exemplary embodiments, it is not limited thereto. It should be appreciated that variations may be made in the described embodiments by persons skilled in the art without departing from the scope of the technology as defined by the following claims. The limitations in the claims are to be interpreted broadly based on the language employed in the claims and not limited to examples described in this specification or during the prosecution of the application, and the examples are to be construed as non-exclusive. For example, in this disclosure, the term "preferably", "preferred" or the like is non-exclusive and means "preferably", but not limited to. The use of the terms first, second, etc. do not denote any order or importance, but rather the terms first, second, etc. are used to distinguish one element from another. The term "substantially" and its variations are defined as being largely but not necessarily wholly what is specified as understood by one of ordinary skill in the art. The term "about" or "approximately" as used herein can allow for a degree of variability in a value or range. Moreover, no element or component in this disclosure is intended to be dedicated to the public regardless of whether the element or component is explicitly recited in the following claims.

What is claimed is:
1. An image forming apparatus comprising:
 an image forming unit that forms a developer image;
 a transfer unit that transfers the developer image formed by the image forming unit onto a transfer object; and
 a controller that performs a printing control that controls an operation of each of the image forming unit and the transfer unit on a basis of printing data that defines a print image having a plurality of pixels, the controller performing the printing control to cause a first printing operation and a second printing operation to be executed,
 the first printing operation forming a first developer image and transferring the first developer image onto the transfer object, the first developer image being the developer image directed to an entire pixel region of the print image, and
 the second printing operation forming a second developer image and transferring the second developer image onto the transfer object, the second developer image being the developer image directed selectively to a high-gradation pixel region, the high-gradation pixel region being a pixel region, having a gradation value equal to or greater than a threshold, of the print image, wherein the image forming unit comprises a plurality of image forming units including a first image forming unit that forms the first developer image and a second image forming unit that forms the second developer image, and the first image forming unit and the second image forming unit respectively form the first developer image and the second developer image with use of respective developers having a same color as each other and are made of a same material as each other.

2. The image forming apparatus according to claim 1, wherein the controller performs the printing control to cause the second printing operation to be executed prior to the first printing operation.

3. The image forming apparatus according to claim 1, wherein the controller performs the printing control to cause the second printing operation to be executed multiple times.

4. The image forming apparatus according to claim 1, wherein the controller performs the printing control to cause the developer images having the same color as each other to be transferred onto the transfer object upon the first printing operation and the second printing operation at least for the high-gradation pixel region.

5. The image forming apparatus according to claim 1, wherein the plurality of image forming units further includes a third image forming unit that forms the developer image with use of a developer having a color that is different from the color of the developer used by each of the first image forming unit and the second image forming unit, and the first image forming unit and the second image forming unit are disposed adjacent to each other along a conveying path of the transfer object.

6. The image forming apparatus according to claim 5, wherein the controller performs the printing control to cause an operation of the third image forming unit to be stopped at least upon the second printing operation.

7. The image forming apparatus according to claim 1, wherein the transfer unit sequentially transfers the first developer image and the second developer image both formed by the image forming unit onto the transfer object.

8. The image forming apparatus according to claim 1, wherein the controller:

compares the gradation value of each of the pixels included in the printing data with the threshold;

selectively extracts the pixels each having the gradation value equal to or greater than the threshold and thereby generates high-gradation printing data directed to the formation of the second developer image; and performs the printing control to cause the second printing operation to be executed on a basis of the high-gradation printing data.

9. The image forming apparatus according to claim 1, wherein the threshold corresponds to the gradation value of 100%.

10. The image forming apparatus according to claim 1, wherein the image forming unit is disposed along a conveying path of an intermediate transfer belt that serves as the transfer object, and the transfer unit performs a primary transfer of the developer image formed by the image forming unit on the intermediate transfer belt, and performs a secondary transfer of the developer image transferred onto the intermediate transfer belt on a print medium.

11. The image forming apparatus according to claim 1, wherein the image forming unit is disposed along a conveying path of a print medium that serves as the transfer object, and the transfer unit directly transfers the developer image formed by the image forming unit onto the print medium.

12. The image forming apparatus according to claim 1, wherein the printing data comprises medical image data, and the high-gradation pixel region comprises a background region and excludes an affected-site region.

13. An image forming apparatus comprising:

an image forming unit that forms a developer image;

a transfer unit that transfers the developer image formed by the image forming unit onto a transfer object; and a controller that performs a printing control that controls an operation of each of the image forming unit and the transfer unit on a basis of printing data that defines a print image having a plurality of pixels, the controller performing the printing control to cause a first printing operation and a second printing operation to be executed, the first printing operation forming a first developer image and transferring the first developer image onto the transfer object, the first developer image being the developer image directed to an entire pixel region of the print image, and the second printing operation forming a second developer image and transferring the second developer image onto the transfer object, the second developer image being the developer image directed selectively to a high-gradation pixel region, the high-gradation pixel region being a pixel region, having a gradation value equal to or greater than a threshold, of the print image, wherein the threshold corresponds to the gradation value of 100%.

14. The image forming apparatus according to claim 13, wherein the image forming unit comprises a plurality of image forming units including a first image forming unit that forms the first developer image and a second image forming unit that forms the second developer image, the first image forming unit and the second image forming unit respectively form the first developer image and the second developer image with use of respective developers having a same color as each other, the plurality of image forming units further includes a third image forming unit that forms the developer image with use of a developer having a color that is different from the color of the developer used by each of the first image forming unit and the second image forming unit, the first image forming unit and the second image forming unit are disposed adjacent to each other along a conveying path of the transfer object, and the controller performs the printing control to cause an operation of the third image forming unit to be stopped at least upon the second printing operation.

15. The image forming apparatus according to claim 13, wherein the transfer unit sequentially transfers the first developer image and the second developer image both formed by the image forming unit onto the transfer object.

16. The image forming apparatus according to claim 13, wherein the image forming unit comprises a plurality of image forming units including a first image forming unit that forms the first developer image and a second image forming unit that forms the second developer image, the first image forming unit and the second image forming unit respectively form the first developer image and the second developer image with use of respective developers having a same color as each other and are made of a same material as each other.

17. The image forming apparatus according to claim 13, wherein the printing data comprises medical image data, and the high-gradation pixel region comprises a background region and excludes an affected-site region.

* * * * *